United States Patent
Kim et al.

(10) Patent No.: US 10,951,253 B2
(45) Date of Patent: Mar. 16, 2021

(54) BENDABLE USER TERMINAL DEVICE AND METHOD FOR DISPLAYING THEREOF

(71) Applicant: SAMSUNG ELECTRONICS CO., LTD., Suwon-si (KR)

(72) Inventors: Dong-Churl Kim, Ansan-si (KR); Kyung-Wan Park, Suwon-si (KR); Jin-Hyoung Park, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 15/909,512

(22) Filed: Mar. 1, 2018

(65) Prior Publication Data

US 2018/0191391 A1 Jul. 5, 2018

Related U.S. Application Data

(63) Continuation of application No. 14/990,420, filed on Jan. 7, 2016, now Pat. No. 9,941,918.

(Continued)

(30) Foreign Application Priority Data

Apr. 30, 2015 (KR) ........................ 10-2015-0061773

(51) Int. Cl.
*H04B 1/3827* (2015.01)
*G06F 3/0487* (2013.01)
(Continued)

(52) U.S. Cl.
CPC ......... *H04B 1/3827* (2013.01); *G06F 1/1626* (2013.01); *G06F 1/1652* (2013.01);
(Continued)

(58) Field of Classification Search
CPC ...... G06F 3/0487; G06F 3/041; G06F 1/1601; G06F 1/1652; G06F 1/1694; G06F 1/1626
See application file for complete search history.

(56) References Cited

U.S. PATENT DOCUMENTS 8,271,047 B2   9/2012  Kim et al.
8,385,987 B2   2/2013  Kim et al.
(Continued)

FOREIGN PATENT DOCUMENTS

CN   101894538 A   11/2010
CN   103369214 A   10/2013
(Continued)

OTHER PUBLICATIONS

Ahmaniemi, et al., "What is a Device Bend Gesture Really Good for?" Apr. 23, 2014, Human Factors in Computing Systems, pp. 3502-3512, XP 058046837.
(Continued)

*Primary Examiner* — Jennifer Mehmood
*Assistant Examiner* — James S Nokham
(74) *Attorney, Agent, or Firm* — Sughrue Mion, PLLC

(57) ABSTRACT

A bendable user terminal device provided with a flexible display controls the flexible display to display information on a first area while the user terminal device is maintained in a bent state based on a detected bending state of the user terminal device, and, in response to the user terminal device changing from the bent state to an unbent state, controls the flexible display not to display the information on the first area.

4 Claims, 38 Drawing Sheets

Related U.S. Application Data

(60) Provisional application No. 62/102,232, filed on Jan. 12, 2015, provisional application No. 62/100,614, filed on Jan. 7, 2015.

(51) Int. Cl.
*G06F 3/0488* (2013.01)
*G06F 1/16* (2006.01)

(52) U.S. Cl.
CPC ........ *G06F 1/1677* (2013.01); *G06F 3/04886* (2013.01); *G06F 2203/04803* (2013.01)

(56) References Cited

U.S. PATENT DOCUMENTS

| | | | |
|---|---|---|---|
| 8,466,851 | B2 | 6/2013 | Huitema et al. |
| 8,502,788 | B2 | 8/2013 | Cho |
| 8,543,166 | B2 | 9/2013 | Choi et al. |
| 8,654,095 | B1* | 2/2014 | Cho ............ G06F 1/1641 345/173 |
| 8,988,391 | B2* | 3/2015 | Reigneau ............ G06F 3/042 345/175 |
| 9,019,415 | B2 | 4/2015 | Ma et al. |
| 9,239,594 | B2 | 1/2016 | Lee et al. |
| 9,344,672 | B2 | 5/2016 | Lee |
| 9,430,184 | B2 | 8/2016 | Cho et al. |
| 9,448,660 | B2 | 9/2016 | Seo et al. |
| 9,606,574 | B2 | 3/2017 | Park et al. |
| 9,864,438 | B2 | 1/2018 | Seo et al. |
| 10,114,476 | B2 | 10/2018 | Seo et al. |
| 10,275,045 | B2 | 4/2019 | Seo et al. |
| 2004/0263670 | A1 | 10/2004 | Yamasaki |
| 2005/0140646 | A1 | 6/2005 | Nozawa |
| 2006/0034042 | A1 | 2/2006 | Hisano et al. |
| 2007/0075915 | A1 | 4/2007 | Cheon et al. |
| 2010/0117975 | A1* | 5/2010 | Cho ............ G06F 1/1626 345/173 |
| 2010/0120470 | A1 | 5/2010 | Kim et al. |
| 2010/0171683 | A1 | 7/2010 | Huitema et al. |
| 2010/0182265 | A1 | 7/2010 | Kim et al. |
| 2011/0086680 | A1 | 4/2011 | Kim et al. |
| 2011/0134087 | A1 | 6/2011 | Moriwaki |
| 2011/0187681 | A1 | 8/2011 | Kim et al. |
| 2013/0093669 | A1 | 4/2013 | Park et al. |
| 2013/0135182 | A1 | 5/2013 | Jung et al. |
| 2013/0145311 | A1 | 6/2013 | Joo |
| 2013/0154971 | A1 | 6/2013 | Kang et al. |
| 2013/0176248 | A1 | 7/2013 | Shin et al. |
| 2013/0229324 | A1 | 9/2013 | Zhang et al. |
| 2013/0265262 | A1* | 10/2013 | Jung ............ G06F 3/041 345/173 |
| 2013/0296000 | A1* | 11/2013 | Park ............ G09G 3/001 455/566 |
| 2013/0300686 | A1* | 11/2013 | Yoon ............ G06F 3/017 345/173 |
| 2013/0303686 | A1* | 11/2013 | Kawashima ............ B60C 1/00 524/575.5 |
| 2013/0307816 | A1* | 11/2013 | Lee ............ G06F 1/1652 345/174 |
| 2013/0335311 | A1 | 12/2013 | Kim |
| 2014/0015743 | A1* | 1/2014 | Seo ............ G06F 1/3265 345/156 |
| 2014/0028596 | A1* | 1/2014 | Seo ............ G06F 3/0487 345/173 |
| 2014/0028823 | A1 | 1/2014 | Tahk et al. |
| 2014/0035869 | A1* | 2/2014 | Yun ............ G06F 3/0488 345/174 |
| 2014/0049464 | A1* | 2/2014 | Kwak ............ G06F 3/0487 345/156 |
| 2014/0078047 | A1* | 3/2014 | Seo ............ G06F 3/0487 345/156 |
| 2014/0101560 | A1 | 4/2014 | Kwak et al. |
| 2014/0118600 | A1 | 5/2014 | Son et al. |
| 2014/0187227 | A1 | 7/2014 | Song |
| 2014/0192217 | A1 | 7/2014 | Kim et al. |
| 2014/0285476 | A1* | 9/2014 | Cho ............ G06F 1/1601 345/204 |
| 2014/0361980 | A1 | 12/2014 | Iwaki et al. |
| 2015/0331454 | A1 | 11/2015 | Song et al. |
| 2015/0381929 | A1 | 12/2015 | Lee |
| 2016/0062485 | A1 | 3/2016 | Kondo |
| 2016/0085268 | A1 | 3/2016 | Aurongzeb et al. |
| 2016/0321969 | A1 | 11/2016 | Kambhatla |
| 2016/0370877 | A1 | 12/2016 | Seo et al. |
| 2016/0373646 | A1 | 12/2016 | Fredlund et al. |
| 2017/0052566 | A1 | 2/2017 | Ka et al. |
| 2018/0120954 | A1 | 5/2018 | Seo et al. |
| 2019/0033984 | A1 | 1/2019 | Seo et al. |
| 2019/0179425 | A1 | 6/2019 | Seo et al. |

FOREIGN PATENT DOCUMENTS

| | | | |
|---|---|---|---|
| CN | 103425243 | A | 12/2013 |
| CN | 103442104 | A | 12/2013 |
| CN | 103631333 | A | 3/2014 |
| CN | 103645749 | A | 3/2014 |
| EP | 2 500 894 | A1 | 9/2012 |
| EP | 2500894 | A1 | 9/2012 |
| KR | 10-2010-0052227 | A | 5/2010 |
| KR | 10-2012-0130465 | A | 12/2012 |
| KR | 10-2013-0125653 | A | 11/2013 |
| KR | 10-2014-0016082 | A | 2/2014 |
| KR | 10-2014-0034578 | A | 3/2014 |
| TW | 200830234 | | 7/2008 |
| TW | 201413498 | A | 4/2014 |
| TW | 201415343 | A | 4/2014 |
| WO | 2014/030912 | A1 | 2/2014 |
| WO | 2014/042495 | A1 | 3/2014 |
| WO | 2014/119829 | A1 | 8/2014 |

OTHER PUBLICATIONS

Communication dated Jan. 12, 2018, issued by the European Patent Office in counterpart European Application No. 16735176.6.
Communication dated Jan. 25, 2018 issued by the European Patent Office in counterpart European Application No. 16150471.7.
Communication dated Jul. 1, 2016, issued by the International Searching Authority in counterpart International Application No. PCT/KR2016/000121 (PCT/ISA/210).
Communication dated Jun. 6, 2017, from the Intellectual Property Office of Taiwan in counterpart application No. 105100211.
Communication dated May 19, 2016 issued by European Patent Office in counterpart European Application No. 16150471.7.
Communication dated May 19, 2016, from the European Patent Office in counterpart European Application No. 16150471.7.
Communication dated May 19, 2017, issued by the United States Patent and Trademark Office in counterpart U.S. Appl. No. 14/990,420.
Communication dated Nov. 29, 2017 issued by the United States Patent and Trademark Office in counterpart U.S. Appl. No. 14/990,420.
Communication issued by the European Patent Office dated Jan. 25, 2018 in counterpart European Patent Application No. 16150471.7.
Communication issued by the United States Patent and Trademark Office dated Jan. 25, 2018 in counterpart U.S. Appl. No. 14/990,075.
Communication dated Jan. 12, 2018, issued by the European Patent Office in counterpart European Patent Application No. 16735176.6.
Communication dated Oct. 30, 2017, issued by the United States Patent and Trademark Office in counterpart U.S. Appl. No. 14/990,075.
International Search Report and Written Opinion, issued by International Searching Authority in corresponding International Application No. PCT/KR2016/000138, dated Jun. 14, 2016, (PCT/ISA/220, PCT/ISA/210 & PCT/ISA/237).
International Search Report dated Jun. 14, 2016 issued by International Searching Authority in counterpart International Application No. PCT/KR2016/000138.
International Search Report for PCT/KR2016/000121 dated Jul. 1, 2016 [PCT/ISA/210].
Teemu T Ammani E Mi et al: "What is a device bend gesture really good for?", Human Factors in Computing Systems, ACM, Apr. 26, 2014 (Apr. 26, 2014), pp. 3503-3512, XP0580468.

(56) References Cited

OTHER PUBLICATIONS

Written Opinion dated Jun. 14, 2016 issued by International Searching Authority in counterpart International Application No. PCT/KR2016/000138.
Written Opinion for PCT/KR2016/000121 dated Jul. 1, 2016 [PCT/ISA/237].
Office Action issued in parent U.S. Appl. No. 14/990,420 dated May 19, 2017.
Notice of Allowance issued in parent U.S. Appl. No. 14/990,420 dated Nov. 29, 2017.
Communication from United States Patent and Trademark Office dated Feb. 10, 2017, in U.S. Appl. No. 14/990,075.
Communication from United States Patent and Trademark Office dated Aug. 10, 2017, in U.S. Appl. No. 14/990,075.
Communication dated Jul. 25, 2018, issued by the United States Patent Office in counterpart U.S. Appl. No. 14/990,075.
Communication dated Oct. 31, 2018, issued by the State Intellectual Property Office of P.R. China in counterpart Chinese Application No. 201680010331.0.
Communication dated Jul. 24, 2019 issued by the State Intellectual Property Office of P.R. China in counterpart Chinese Application No. 201680010331.0.
Communication dated Jul. 29, 2019 issued by the Korean Intellectual Property Office in counterpart Korean Application No. 10-2015-061773.
Communication dated Nov. 5, 2019, issued by the State Intellectual Property Office of P.R. China in counterpart Chinese Application No. 201680013564.6.
Communication dated Jan. 9, 2020, issued by the State Intellectual Property Office of P.R. China in counterpart Chinese Application No. 201680010331.0.
Office Action dated Nov. 18, 2019, issued by the USPTO in U.S. Appl. No. 16/371,821.
Communication dated Feb. 25, 2020, issued by the Korean Intellectual Property Office in counterpart Korean Application No. 10-2015-0061773.
Communication dated May 19, 2020, issued by the USPTO in counterpart U.S. Appl. No. 16/371,821.
Communication dated Jul. 31, 2020 issued by the State Intellectual Property Office of P.R. China in counterpart Chinese Application No. 201680013564.6.
Communication dated Sep. 30, 2020, issued by the USPTO in counterpart U.S. Appl. No. 16/371,821.
Communication dated Nov. 16, 2020, issued by the Korean Intellectual Property Office in corresponding Korean Application No. 10-2020-0089467.
Communication dated Nov. 20, 2020, from the European Patent Office in counterpart European Application No. 16735176.6.

* cited by examiner (a)

(b)

(c)

(a)

(b)

(c)

(a)

(b)

(c)

(a)

(b)

(c)

(a)

(b)

(c)

(a)

(b)

(c)

(a)

(b)

(c)

(a)

(b)

(c)

(a)

(b)

(a)

(b)

(c)

(d)

(a)

(b)

(c)

(a)

(b)

(c)

(d)

(a)

(b)

(a)

(b)

(a)

(b)

(c-1)

(c-2)

(a)

(b)

(a)        (b)

(d)

(c)

BENDABLE USER TERMINAL DEVICE AND METHOD FOR DISPLAYING THEREOF

CROSS-REFERENCE TO RELATED APPLICATIONS

This is a continuation of U.S. application Ser. No. 14/990,420 filed on Jan. 7, 2016, which claims priority from U.S. Provisional Application Nos. 62/100,614 and 62/102,232, filed on Jan. 7, 2015 and Jan. 12, 2015, respectively, in the United States Patent and Trademark Office, and Korean Patent Application No. 10-2015-0061773, filed on Apr. 30, 2015, in the Korean Intellectual Property Office, the disclosures of which are incorporated herein by reference in their entirety.

BACKGROUND

Field

Apparatuses and methods consistent with exemplary embodiments relate to a flexible display, and more particularly, to a method and a user terminal device for displaying a digital content using a flexible display.

Description of the Related Art

As display technology is developing, user terminal devices provided with a flexible display are coming into the market. The flexible display refers to a display which is bendable.

The flexible display is manufactured by replacing a glass substrate enclosing liquid crystals, which is used in existing Liquid Crystal Display (LCD) and an Organic Light Emitting Diode (OLED), with a plastic film, and thus has flexibility and can be folded and unfolded. Since the flexible display uses the plastic substrate instead of the normally used glass substrate, a low-temperature manufacturing process rather than an existing manufacturing process is used in order to prevent damage to the substrate.

The flexible display is thin, light, and impact-resistant. In addition, the flexible display has advantages. For example, it can be bent and crooked. Further, it can be manufactured in various forms. On account of these advantages, the flexible display can be utilized in place of the glass substrate-based displays in many industrial fields.

For example, the flexible display may be utilized in the field of e-books which is replacing publications such as magazines, textbooks, books, and comic books. Also, the flexible display may be used in the field of new portable IT products such as a microminiaturized PC which is coupled with a folded or rolled display, a smart card identifies information in real time, etc. In addition, since the flexible display uses a flexible plastic substrate, its application can be expanded to fields of clothing and medical diagnosis.

As the flexible displays are widely used, new interfacing methods or information displaying methods using the bendable or foldable property of the flexible displays are being increasingly studied and researched.

SUMMARY

When a user uses a user terminal device to view information, how long and how many times the user uses the user terminal device may vary according a type of information. For example, when the user uses a content such as a movie or music, the time during which the user uses the user terminal device is related to the reproducing time of the content. On the other hand, when the user identifies brief information such as time, weather, message, etc., the time during which the user uses the user terminal device may be relatively short.

When the user uses brief information such as glimpse information, the user normally identifies the information by simply pressing a home key or a power key of the user terminal device. In addition, when there is no input from the user, the displayed information requires the battery of the user terminal to be consumed until the displayed information fades out after a predetermined time and automatically disappears.

According to an aspect of the present disclosure, a user terminal device which is bendable includes: a flexible display configured to be divided into a first area and a second area in response to the user terminal device being bent; a bending sensor configured to detect a bending state of the user terminal device; and a controller configured to control the flexible display to display information on the first area while the user terminal device is maintained in a bent state based on the detected bending state, and, in response to the user terminal device changing from the bent state to an unbent state, control the flexible display not to display the information on the first area.

The user terminal device may further include a bending part configured to link two parts of the user terminal device, thereby enabling the user terminal device to be bent with reference to one axis, and the bending sensor may be configured to detect the bending state of the user terminal device based on a bending state of the bending part.

The user terminal device may be in the bent state while an external pressure applied to the user terminal device in a bending direction is maintained, and the user terminal device may automatically change from the bent state to the unbent state in response to the external pressure being removed.

The user terminal device may be in the bent state while an external pressure applied to the user terminal device in a bending direction is maintained, and the user terminal device may be maintained in the bent state after the external pressure is removed.

The controller may be further configured to control the flexible display to display information on the second area.

The user terminal device may further comprise a bending part configured to link two parts of the user terminal device, thereby enabling the user terminal device to be bent with reference to one axis, and the flexible display is divided into the first are and the second area with reference to the one axis.

In response to the bending state changing from the unbent state to the bent state, the controller may be further configured to change the first area from an inactivation state to an activation state and control the flexible display to display the information on the first area.

The controller may be further configured to control the flexible display to display an execution screen of a first application on the first area while the user terminal device is in the bent state and to display an execution screen of a second application on the first area in response to the bending state changing from the bent state to the unbent state.

The controller may be further configured to control the flexible display to display an execution screen of an application on the first area while the user terminal device is in the bent state and to display at least one UI element used in the application in response to the bending state changing from the bent state to the unbent state.

The information may comprise at least one of a message, time information, weather information, news information, and information on a missed call.

The controller is further configured to control the flexible display to display an execution screen of a first application on the first area in the step-bending state, and input at least one command used in the first application in response to the bending state changing from the step-bending state to the pre-bending state or the unbent state.

The bending state may comprise a step-bending state in which the user terminal device is maintained in the bent state without any external pressure and a pre-bending state in which the user terminal device automatically returns to previous bending state without any external pressure.

The controller may be further configured to control the flexible display to display an execution screen of a first application on the first area in the step-bending state and display an execution screen of a second application on the first area in the pre-bending state.

The controller may be further configured to control the flexible display to display an execution screen of a first application on the first area in the pre-bending state and display at least one UI element used in the first application on the second area in the step-bending state.

According to one or more exemplary embodiments, there is provided a method performed by a user terminal device to display a content using a flexible display, the method including: displaying information on a first area of the flexible display while the user terminal device is in a bent state in which the flexible display is divided into the first area and a second area; and removing the information on the first area in response to a bending state changing from the bent state to an unbent state.

The displaying the information on the first area of the flexible display may comprise maintaining the bent state while an external pressure applied to the user terminal device in a bending direction is maintained, and the removing the information on the first area of the flexible display may comprise automatically changing the bending state from the bent state to the unbent state in response to the external pressure being removed.

The displaying no information on the first area may comprise displaying another information on the second area.

The flexible display may be divided into the first area and the second area with reference to one axis.

The displaying the information on the first area may comprise changing the flexible display from an inactivation state to an activation state.

The displaying the information on the first area may comprise displaying an execution screen of a first application on the first area, and removing the information on the first area may comprise displaying an execution screen of a second application on the first area.

The bending state may comprise a step-bending state and a pre-bending state, the displaying the information on the first area may comprise displaying an execution screen of a first application on the first area in the step-bending state and displaying at least one UI element used in the first application on the first area in the pre-bending state, and the user terminal device may be maintained in the bent state without any external pressure in the step-bending state and automatically returns to a previous bending state without any external pressure in the pre-bending state.

The information may comprise at least one of a message, time information, weather information, news information, and information on a missed call.

BRIEF DESCRIPTION OF THE DRAWINGS

The above and/or other aspects of the present disclosure will be more apparent by describing certain exemplary embodiments of the present disclosure with reference to the accompanying drawings, in which.

DETAILED DESCRIPTION OF THE EXEMPLARY EMBODIMENTS

Figure 1:
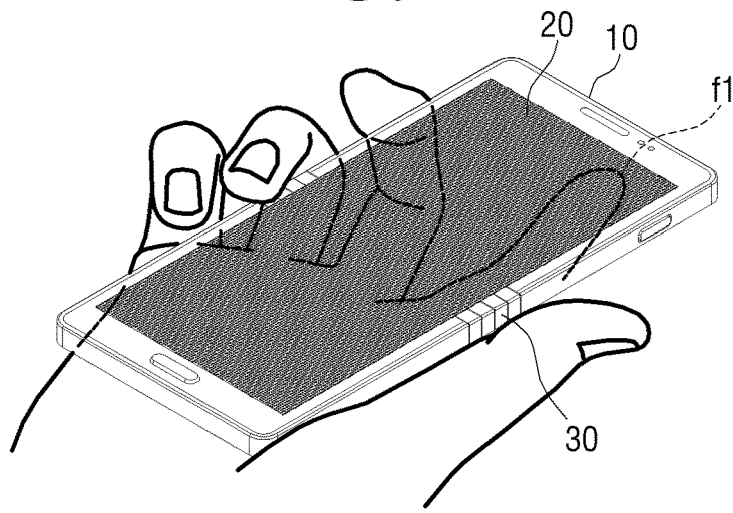
FIG. 1 illustrates the bending states of a user terminal device according to an exemplary embodiment.
Figure 1:
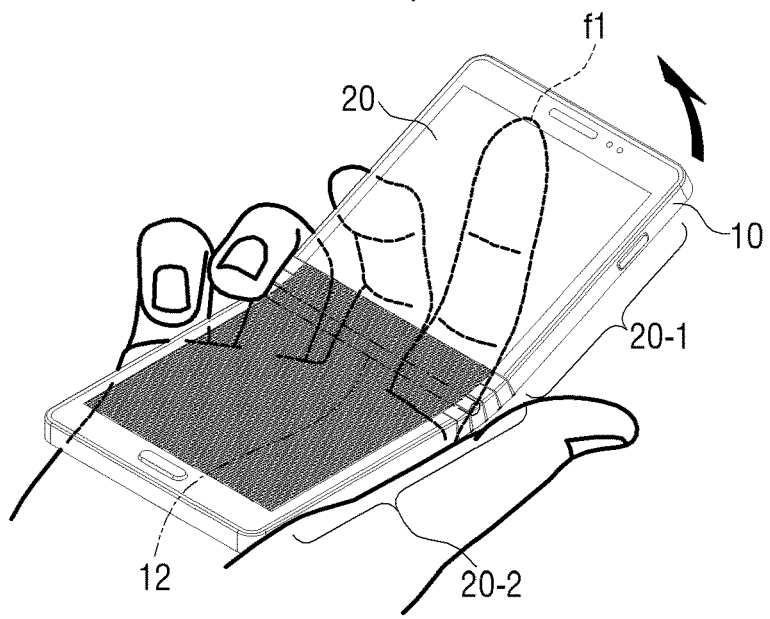
Figure 1:
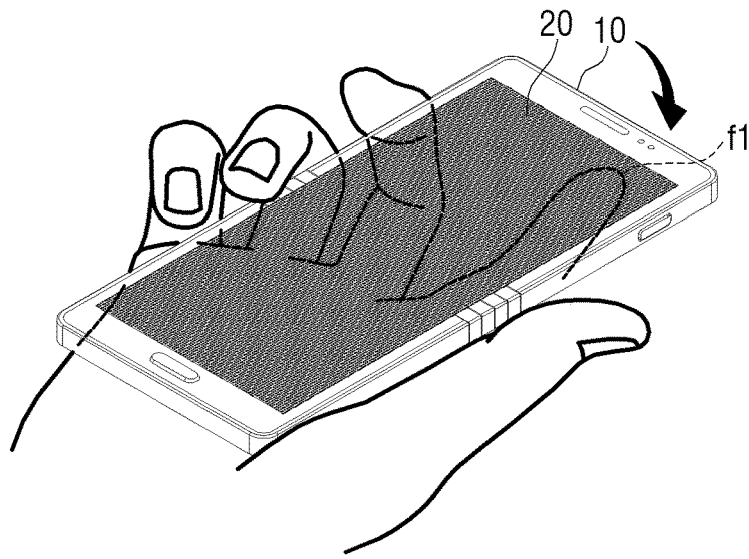

Hereinafter, the terms used in exemplary embodiments will be explained briefly, and exemplary embodiments will be described in greater detail with reference to the accompanying drawings.

Although the terms used in the exemplary embodiments are general terms which are widely used in the present time considering the functions in the present disclosure, the terms may be changed depending on an intention of a person skilled in the art, a precedent, and introduction of new technology. In addition, in a special case, terms selected by the applicant may be used. In this case, the meaning of the terms will be explained in detail in the corresponding detailed descriptions. Therefore, the terms used in the exemplary embodiments should be defined based on the meaning thereof and the descriptions of the present disclosure, rather than based on their names only.

Although the terms such as "first" and "second" may be used to explain various elements, the elements should not be limited by these terms. These terms may be used for the purpose of distinguishing one element from another element. For example, a first element may be named a second element without departing from the scope of right of the various exemplary embodiments of the present disclosure, and similarly, a second element may be named a first element. The term "and/or" includes a combination of a plurality of described relevant items or any item of a plurality of described relevant items.

In addition, the singular forms are intended to include the plural forms as well, unless the context clearly indicates otherwise.

In addition, it should be understood that the terms "include" or "have" used in the exemplary embodiments of the present disclosure are to indicate the presence of features, numbers, steps, operations, elements, parts, or a combination thereof described in the specifications, and do not preclude the presence or addition of one or more other features, numbers, steps, operations, elements, parts, or a combination thereof.

In addition, "module" or "unit" used in the exemplary embodiments perform at least one function or operation and may be implemented by using hardware or software or a combination of hardware and software. In addition, a plurality of "modules" or a plurality of "units" may be integrated into at least one module and implemented by using at least one processor (not shown), except for "modules" or "units" which need to be implemented by using specific hardware.

It will be understood that, when an element is mentioned as being "connected" to another element, the element may be "directly connected" to another element, and may be "electrically connected" to another element with an intervening element between the element and another element.

In addition, the term "user input" in the exemplary embodiments may include at least one of a touch input, a bending input, a voice input, a button input, and a multi-modal input, but is not limited to these.

In addition, the term "touch input" in the exemplary embodiments refers to a touch gesture which is performed by a user on a display and a cover to control a device. In addition, the "touch input" may include a touch which is not in contact with the display and is distanced away from the display by more than a predetermined distance (for example, floating or hovering). The touch input may include a touch and hold gesture, a tap gesture which touches and then removes the touch, a double tap gesture, a panning gesture, a flick gesture, and a touch and drag gesture which touches and then moves in one direction while still touching, a pinch gesture, and the like, but is not limited to these.

In addition, the term "button input" in the exemplary embodiments refers to an input of a user to control a device by using a physical button attached to the device In addition, the term "motion input" in the exemplary embodiments refers to motion which is made by a user for a device to control the device. For example, the motion input may include an input to rotate a device, tilt a device, or move a device vertically and horizontally.

In addition, the term "multi-input" in the exemplary embodiments refers to a combination of two or more input methods. For example, a device may receive a touch input and a motion input of a user, and may receive a touch input and a voice input of a user.

In addition, the term "application" in the exemplary embodiments refers to a set of computer programs designed to perform a specific function. There may be various applications in the exemplary embodiments. For example, the application may include a game application, a moving image replay application, a map application, a memo application, a calendar application, a phone book application, a broadcast application, an exercise support application, a payment application, a photo folder application, and the like, but is not limited these.

In addition, the term "application identification information" in the exemplary embodiments may be unique information for distinguishing one application from the other applications. For example, the application identification information may include an icon, an index item, link information, and the like, but is not limited these.

In addition, the term "User Interface (UI) element" in the exemplary embodiments refers to an element which can interact with a user and thus provide visual, auditory, or olfactory feedback according to a user input. The UI element may be represented in the form of at least one of an image, a text, and a moving image. In addition, an area which does not display the above-described information but can provide feedback according to a user input may be referred to as a UI element. In addition, the UI element may be the above-described application identification information, for example.

In addition, the "bent state of the user terminal device" in the exemplary embodiments refers to a state in which the user terminal device is bent. To the contrary, the "unbent state of the user terminal device" used throughout the exemplary embodiments refers to a state in which the user terminal device is unbent. These terms will be explained in detail below with reference to FIG. 1.

All of the terms used herein including technical or scientific terms have the same meanings as those generally understood by an ordinary skilled person in the related art unless they are defined otherwise. The terms defined in a generally used dictionary should be interpreted as having the same meanings as the contextual meanings of the relevant technology and should not be interpreted as having ideal or exaggerated meanings unless they are clearly defined in the various exemplary embodiments.

FIG. 1 is a view showing various states of a terminal device according to an exemplary embodiment.

Referring to FIG. 1, the terminal device 10 may be implemented according to an exemplary embodiment to achieve various purposes. For example, the user terminal device 10 may include a mobile phone, a smart phone, a laptop computer, a tablet device, an e-book device, a digital broadcasting device, Personal Digital Assistants (PDAs), a Portable Multimedia Player (PMP), a navigation device, or a wearable device such as a smart watch, smart glasses, a Head-Mounted Display (HMD), or the like.

The terminal device 10 may employ a flexible display 20. The flexible display 20 may include various kinds of displays depending on how their shapes are deformed by an external force. For example, a foldable display can be folded by a specific angle (or curvature) and unfolded, a bendable display which can be bent by a specific curvature and unbent, and a rollable display which can be rolled into a cylindrical shape.

The flexible display 20 may provide a screen showing various information which is normally displayed on an existing display such as an LCD, a Light Emitting Diode (LED) display, or the like. For example, the flexible display 20 may display an execution screen of an application, a lock screen, a background screen, a home screen, or the like.

In addition, the flexible display 20 may be provided with an input interfacing function of a touch screen or a touch pad. Accordingly, the flexible display 20 may detect a touch input by a user, and the user terminal device 10 may be controlled according to the detected touch input.

The user terminal device 10 in an unbent state may be bent in response to an external pressure and may return to its unbent state automatically after the external pressure is removed. Also, the user terminal device 10 in its bent state may be unbent in response to an external pressure Hereinafter, a screen displayed on a part, e.g., a first area 20-1, of the flexible display 10 while an external pressure applied in a bending direction to the user terminal device 10 is maintained will be referred to as a quick viewing window.

View (a) of FIG. 1 illustrates a user's hand gripping the user terminal device 10 in an unbent state. The user terminal device 10 may include the flexible display 20 and a bending part 30. The bending part 30 may include an element which enables bending the user terminal device 10 up to a specific angle or specific curvature, and an element which enables returning the bent user terminal device 10 to the unbent state. According to an exemplary embodiment, the bending part 30 may further include a bending sensor to detect the bending state of the user terminal device 10.

In view (a) of FIG. 1, while the user terminal device 100 is being gripped, the flexible display 20 may be in an inactivation state. Herein, the inactivation state of the flexible display 20 may refer to a black screen state of the flexible display 20, a state in which the flexible display 20 is turned off, or a state in which the display panel of the flexible display 20 is turned off. In addition, the inactivation state of the flexible display 20 may refer to a state in which nothing is displayed on the flexible display 20.

While the user terminal device 10 is in an unbent state as shown in view (a) of FIG. 1, an external pressure may be applied to the user terminal device 10. For example, the external pressure may be a force by which the user pushes the user terminal device 10 forward using a finger f1 placed on the upper portion of the rear surface of the user terminal device 10.

In this case, the user terminal device 10 may changes from an unbent state to a bent state in which the user terminal device is bent with reference to an axis 12 as shown in view (b) of FIG. 1. In response to the user terminal device 10 being bent, the flexible display 20 may be divided into a first area 20-1 and a second area 20-2. In this case, the first area 20-1 may be an area located above the axis 12, whereas the second area 20-2 is the other area of the flexible display 20 located under the axis 12. While the user terminal device 10 is in the bent state, the user terminal device 10 may control the flexible display 20 to activate the first area 20-1. A size of divided areas may be differently set in exemplary embodiments and is not limited to a specific one. For example, the first area 20-1 may be about 40% of the display size of the flexible display 20.

The activation state of the first area 20-1 of the flexible display 20 may refer to a state in which the first area 20-1 of the flexible display 20 displays a screen with brightness, or a state in which a screen including information is displayed on the first area 20-1 of the flexible display 20.

In this case, the information may be brief information such as a content or glimpse information. For example, the brief information may be information such as time, weather, messages, schedule, alarm, memo, news, or the like. In addition, the brief information may be as a part of an application or a widget (for example, a weather widget, a schedule widget, a notification widget, a memo widget, a gallery widget, a camera widget, a clock widget, a feed widget, etc.). In addition, the information may be a UI element capable of interacting with the user, such as a menu, a button, an icon, or the like. Such information may be displayed with a visual effect. For example, the information may be displayed with a fade-in effect.

While the user terminal device 10 is in the bent state, the external pressure applied to the user terminal device 10 may be removed. For example, the user may stop pushing the upper portion of the rear surface of the user terminal device 10 with the finger f1.

In this case, the user terminal device 10 may change from the bent state back to the unbent state with reference to the one axis 12 as shown in view (c) of FIG. 1. In response to the user terminal device 10 being unbent, the user terminal device 10 may change the first area 20-1 back to the inactivation state. As a result, the information displayed on the first area 20-1 may disappear. The information may disappear with a visual effect. For example, the information may be removed with a fade-out effect.

Figure 2:
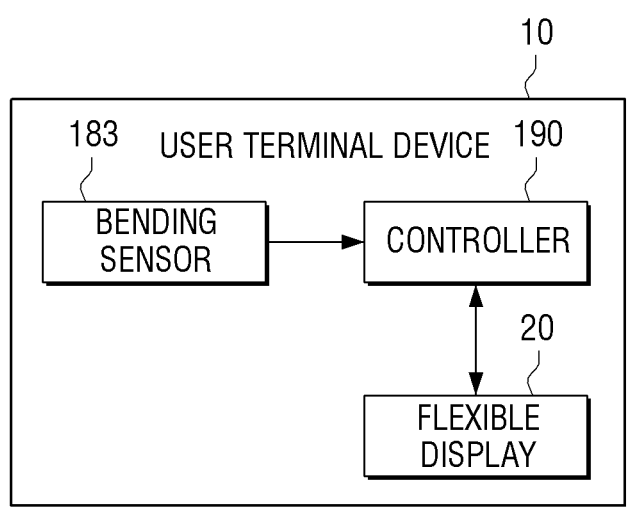
FIG. 2 is a block diagram showing a user terminal device according to an exemplary embodiment.

FIG. 2 is a block diagram of a user terminal device according to an exemplary embodiment.

Referring to FIG. 2, the user terminal device 10 may include a flexible display 20, a bending sensor 183, and a controller 190. In FIG. 2, only some elements related to the exemplary embodiments will be explained to prevent the key features of the exemplary embodiments from being obscured. However, an ordinary skilled person in the related art would readily understand that other elements may be included in addition to the elements shown in FIG. 2.

The bending sensor 183 may detect the bending state of the user terminal device 10. That is, the bending sensor 183 may detect at least one of a bent/unbent state indicating whether or not the user terminal device 10 is bent, a bending speed, a bending angle, and a bending time of the user terminal device 10. Further, the bent state may include a step-bending state in which the user terminal device 10 is maintained in the bent state without any external pressure and a pre-bending state in which the user terminal device automatically returns to previous bending state without any external pressure.

The flexible display 20 may be activated or inactivated according to the bending state of the user terminal device 10. For example, the first area 20-1 of the flexible display 20 may be activated while the user terminal device 10 is in the bent state. To the contrary, the first area 20-1 of the flexible display 20 may be inactivated when the user terminal device 10 returns to the unbent state.

The controller 130 may be implemented as at least one processor such as a Central Processing Unit (CPU), an Application Processor (AP), or the like, and may control the overall operation of the user terminal device 10.

Specifically, the controller 130 may control the flexible display 20 based on the bending state of the user terminal device 10. While the user terminal device 10 is in the bent state, the controller 130 may control the flexible display 20 to display information on the first area 20-1 of the flexible display 20, and, in response to the user terminal device 10 changing from the bent state to the unbent state, the controller 130 may control the flexible display 20 not to display the information on the first area 20-1 anymore.

Figure 3:
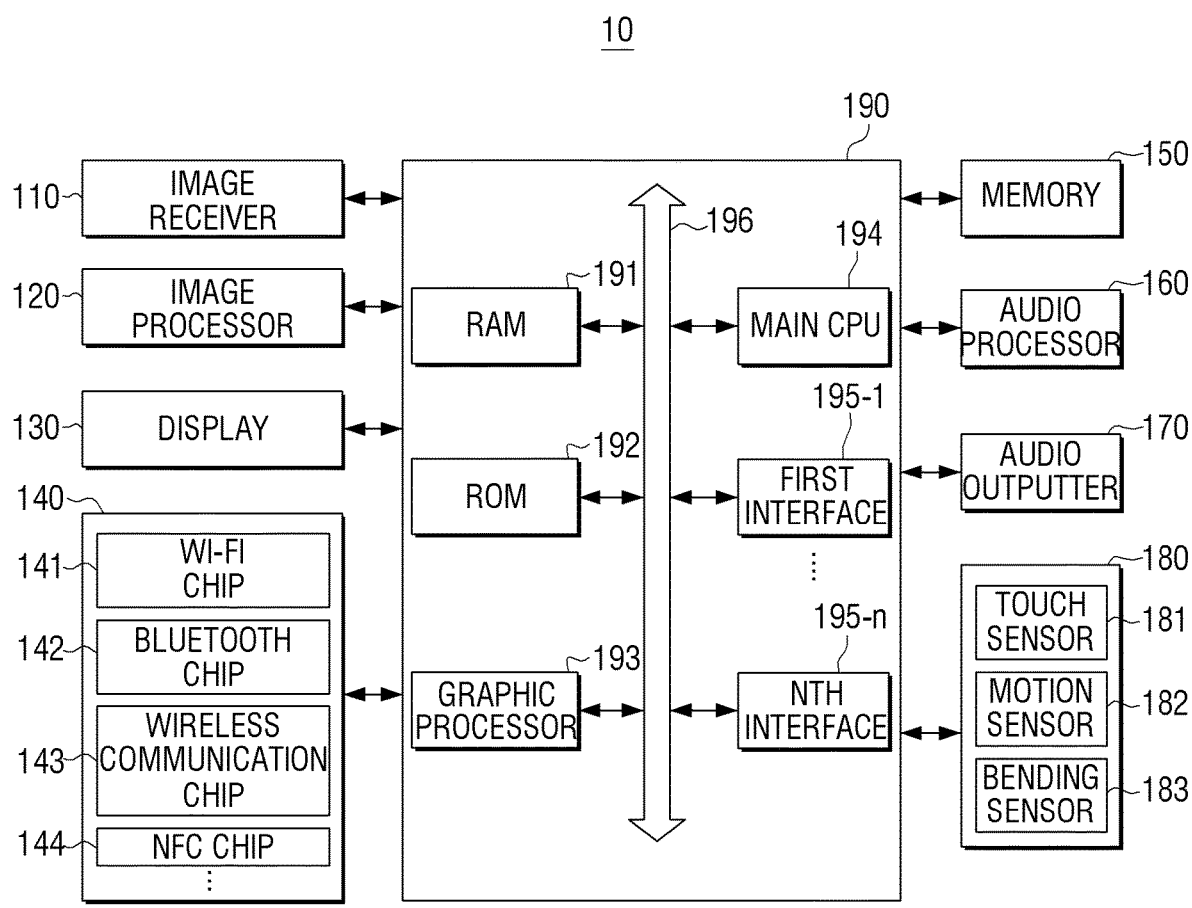
FIG. 3 is a block diagram showing a user terminal device according to another exemplary embodiment.

FIG. 3 is a block diagram of the user terminal device 10 according to another exemplary embodiment.

Referring to FIG. 3, the user terminal device 10 may include an image receiver 110, an image processor 120, a display 130, a communicator 140, a memory 150, an audio processor 160, an audio outputter 170, a sensor unit 180, and a controller (or a processor) 190.

FIG. 3 illustrates various overall elements of the user terminal device 10 on the assumption that the user terminal device 10 is provided with various functions such as a content providing function, a display function, or the like. Therefore, some of the elements shown in FIG. 1 may be omitted or changed or another element may be added according to an exemplary embodiment.

The image receiver 110 may receive image data through various sources. For example, the image receiver 110 may receive broadcast data from an external broadcasting station, receive Video On Demand (VOD) data from an external server in real time, or receive image data from an external device.

The image processor 120 may be an element for processing image data received from the image receiver 110. The image processor 120 may perform various image processing operations such as decoding, scaling, noise filtering, frame rate conversion, resolution conversion, etc. with respect to the image data.

The display 130 may display at least one of video frames of the image data which are processed by the image processor 120, or various screens which are generated by a graphic processor 193.

The display 130 may be implemented in various forms. For example, the display may be, but is not limited to, an LCD, an OLED display, an Active-Matrix (AM)-OLED, a Plasma Display Panel, or the like. The display 130 may further include an additional element according to its implementation method. For example, when the display 130 employs a liquid crystal method, the display 130 may include an LCD display panel, a backlight unit to supply light to the LCD display panel, and a panel driving substrate to drive the panel.

When the display 130 employs the flexible display 20, the display 130 may have a feature of being bent, crooked or rolled without any damage through a substrate which is thin and flexible like paper. The display 130 may be manufactured using a plastic substrate as well as a normally used glass substrate. When the plastic substrate is used, a low-temperature manufacturing process may be used instead of an existing manufacturing process in order to prevent damage to the substrate. In addition, the display 130 may be manufactured by replacing the glass substrate enclosing liquid crystals normally used in the LCD, the OLED display, the AM-OLED, the PDP, etc. with a plastic film. As a result, the display 130 may be flexible such that it can be folded and unfolded. Moreover, the display 130 is thin, light and also is resistant to impact. In addition, the display 130 can be manufactured in various forms as described above.

The display 130 may have an active matrix screen of a specific screen size (for example, 3 inches, 4 inches, 4.65 inches, 5 inches, 6.5 inches, 8.4 inches, etc.) according to the size of the user terminal device 10. The display 130 may cover at least one side surface of the user terminal device 10 (for example, at least one of a left side, a right side, an upper side, and a lower side), and may be folded by less than a radius of curvature which is effective for the operation of the display 130 (for example, a radius of curvature of 5 cm, 1 cm, 7.5 mm, 5 mm, 4 mm, etc.). The display 130 may be secured to the side surface of the user terminal device 10.

The display 130 may be implemented as a touch screen including a touch sensor 181. The flexible display 20 implemented as the touch screen may have a function of detecting a touch input pressure as well as a touch input location and a touched area, and also, may have a function of detecting a proximity touch as well as a real touch.

The communicator 140 may be configured to communicate with external devices according to various kinds of communication protocols. For example, the communicator 140 may include a Wi-Fi chip 141, a Bluetooth chip 142, a wireless communication chip 143, and a Near Field Communication (NFC) chip 144. The controller 190 may communicate with various external devices using the communicator 140.

In particular, the Wi-Fi chip 141 and the Bluetooth chip 142 communicate in a Wi-Fi protocol and a Bluetooth protocol, respectively. When the Wi-Fi chip 141 or the Bluetooth chip 142 is used, a variety of connection information such as an SSID and a session key may be exchanged first, and communication may be established using the connection information, and then a variety of information may be exchanged. The wireless communication chip 143 refers to a chip which communicates according to various communication standards such as IEEE, Zigbee, 3rd Generation (3G), 3rd Generation Partnership Project (3GPP), Long Term Evolution (LTE), and the like. The NFC chip 144 refers to a chip which operates in an NFC method using a band of 13.56 MHz from among various RF-ID frequency bands such as 135 kHz, 13.56 MHz, 433 MHz, 860-960 MHz, and 2.45 GHz.

The memory 150 may store various programs and data necessary for the operations of the user terminal device 10. The memory 150 may include a non-volatile memory, a volatile memory, a flash memory, a Hard Disk Drive (HHD), or a Solid State Drive (SSD). The memory 150 may be accessed by the controller 190 and may read/record/correct/delete/update data under the control of the controller 190. In this disclosure, the memory 150 may be defined as including a Read Only Memory (ROM) in the controller 190, or a memory card (for example, a micro SD card, a memory stick) mounted in a Random Access Memory (RAM) 191 or the user terminal device 10.

Specifically, the memory 150 may store programs and data for configuring various screens to be displayed on a display area.

Figure 4:
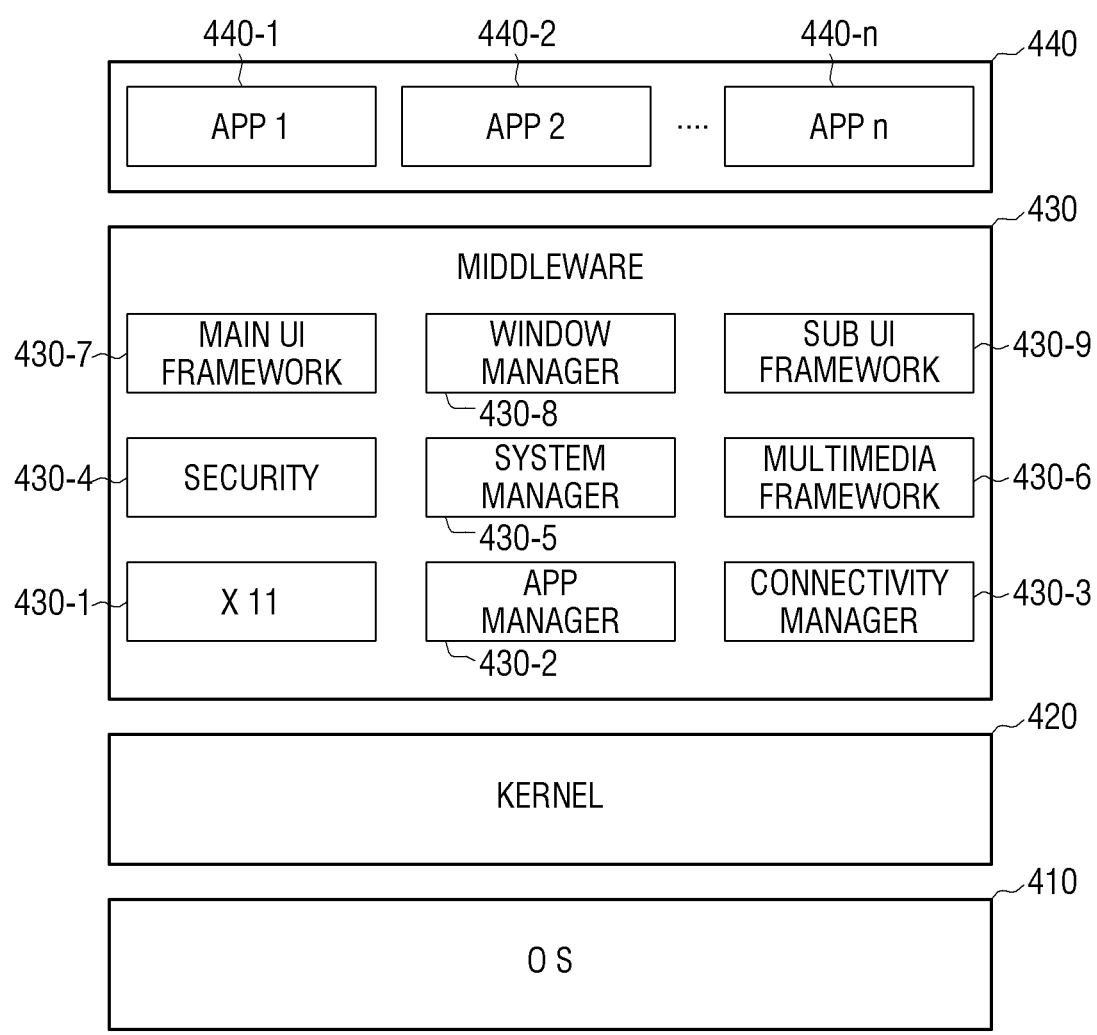
FIG. 4 is a block diagram showing a software stack of a terminal device according to an exemplary embodiment.

Hereinafter, a software stack of the user terminal device 100 will be explained with reference to FIG. 4. Referring to FIG. 4, software including an Operating System (OS) 410, a kernel 420, middleware 430, an application 440, and the like may be stored in the memory 150.

The OS 410 may control and manage the overall operations of hardware. That is, the OS 410 is a layer which is responsible for basic functions regarding hardware management, memory, security, etc.

The kernel 420 may serve as a channel for the middleware 430 to receive various signals including a touch signal detected in the display 130.

The middleware 430 may include various software modules to control the operations of the user terminal device 100. For example, as shown in FIG. 4, the middleware 430 may include an X11 module 430-1, an APP manager 430-2, a connectivity manger 430-3, a security module 430-4, a system manager 430-5, a multimedia framework 430-6, a main UI framework 430-7, a window manager 430-8, and a sub UI framework 430-9.

The X11 module 430-1 is a module which receives various event signals from a variety of hardware provided in the user terminal device 10. For example, the event may be generated in case of detection of a user gesture, occurrence of a system alarm, execution or termination of a specific program, or the like.

The APP manager 430-2 is a module which manages the execution states of various applications 440 installed in the memory 150. In response to an application execution event being detected by the X11 module 430-1, the APP manager 430-2 calls and executes an application corresponding to the event.

The connectivity manager 430-3 is a module which supports wire or wireless network connection. The connectivity manager 430-3 may include various sub modules. For example, the connectivity manager 430-3 may include a DNET module, a Universal Plug and Play (UPnP) module, and the like.

The security module 430-4 is a module which manages and supports security processes, such as certification, permission, etc. for the hardware.

The system manager 430-5 monitors the states of elements in the user terminal device 100, and provides the result of the monitoring to other modules. For example, when a battery life level is low, an error is generated, or network communication is disconnected, the system manager 430-5 may provide a result of the monitoring to the main UI framework 430-7 or the sub UI framework 430-9 and output a notification message or a notification sound.

The multimedia framework 430-6 is a module which reproduces multimedia contents which are stored in the user terminal device 10 or provided from external sources. The multimedia framework 430-6 may include a player module, a camcorder module, a sound processing module, and the like. Accordingly, the multimedia framework 430-6 may create various multimedia contents, generate a screen and a sound, and reproduce the same.

The main UI framework 430-7 is a module which provides various UIs to be displayed on a main area of the display 130, and the sub UI framework 430-9 is a module which provides various UIs to be displayed on a sub area. The main UI framework 430-7 and the sub UI framework 430-9 may include an image compositor module to configure various UI elements, a coordinates compositor module to calculate coordinates for displaying the UI elements, a rendering module to render the configured UI elements on the calculated coordinates, a 2D/3D UI toolkit to provide a tool for configuring a UI in the form of 2D or 3D.

The window manager 430-8 may detect a touch event which is generated using a user's body or a pen, or other input events. When such an event is detected, the window manager 430-8 transmits an event signal to the main UI framework 430-7 or the sub UI framework 430-9 such that an operation corresponding to the event is performed.

In addition, various program modules which are not shown in FIG. 4 may be included in the middleware 430. For example, a writing module which, when the user touches or drags on the screen, draws a line by tracing the dragged line, or an angle calculation module which calculates a pitch angle, a roll angle, and a yaw angle based on a sensor value detected by a motion sensor 182 may be included in the middleware 430.

The application module 440 includes applications 440-1 to 440-$n$ to support various functions. The application module 440 may include program modules to provide various services. For example, a navigation program module, a game module, an e-book module, a calendar module, a notification management module, and the like may be included in the application module 440. The applications may be set as default or may be temporarily set and used when the user uses the applications. When a UI element is selected, a main CPU 194 may execute an application corresponding to the selected UI element using the application module 440.

The software stack shown in FIG. 4 is merely an example and an exemplary embodiment is not limited to this. Therefore, some of the elements may be omitted or changed, and new element may be added when necessary. For example, the memory 150 may store additional program modules such as a sensing module to analyze signals sensed by various sensors, a call information aggregator program module, a VoIP module, a web browser module, and a messaging module for a messenger program, a Short Message Service (SMS) & Multimedia Message Service (MMS) program, and an email program, and the like.

Referring back to FIG. 3, the audio processor 160 is an element which processes audio data. The audio processor 160 may perform various processing operations such as decoding, amplifying, noise filtering, and the like with respect to the audio data. The audio data processed by the audio processor 160 may be outputted to the audio outputter 170.

The audio outputter 170 may output various notification sounds or voice messages as well as various audio data which is obtained after various processing operations such as decoding, amplifying, and noise filtering of the audio processor 160. In particular, the audio outputter 170 may be implemented using a speaker. However, this is merely an example and the audio outputter 170 may be implemented using any other output terminal which can output audio data.

The sensor unit 180 detects a variety of user interaction. The sensor unit 180 may detect at least one of various changes such as an attitude change, an illuminance change, an acceleration change of the user terminal device 10, and transmit a corresponding electric signal to the controller 190. If the sensor unit 180 detects a state change which is made based on the user terminal device 10, a corresponding detection signal may be generated, and transmitted to the controller 190. The sensor unit 180 may include various sensors. Power may be supplied to at least one sensor set under the control of the sensor unit 180 when the user terminal device 100 is activated (or according to user settings) and the sensor detects a state change.

The sensor unit 180 may include at least one of all types of sensing devices which are able to detect the state change of the user terminal device 10. For example, the sensor unit 180 may include at least one of a touch sensor, an acceleration sensor, a gyro sensor, an illuminance sensor, a proximity sensor, a pressure sensor, a noise sensor (for example, a microphone), a video sensor (for example, a camera module), and a timer.

Sensors included in the sensor unit 180 may be classified into a touch sensor 181, a motion sensor 182, and a bending sensor 183 according to a sensing purpose. However, this is merely an example and the sensors of the sensor unit 180 may be classified differently in other exemplary embodiments. This is not a physical classification of the sensors included in the sensor unit 180 and more than two sensors may be combined to serve as one or more of the sensors 181, 182, and 183. In addition, some of the elements or functions of the sensor unit 180 may be incorporated into the controller 190 in an exemplary embodiment.

For example, the touch sensor 181 may acquire output signals generated based on a user input from a touch sensor. The touch sensor 181 may calculate user input information such as a touch location or touch coordinates, the number of touches, touch intensity, a cell ID, a touch angle, or a touch area based on the signal values, and determine a type of touch input using the calculated user input information. The touch sensor 181 may determine the type of touch input using a touch recognition algorithm, touch pattern data, etc. which are stored in a memory. If the type of touch input is determined, the touch sensor 181 may transmit information on the type of touch input to the controller 190. The touch sensor 181 may also detect a proximity touch location (or a hovering location) input by the user.

The controller 190 may perform some functions on behalf of the touch sensor 181. For example, the touch sensor 181 may transmit the signal values acquired from the touch sensor or the user input information calculated based on the signal values to the controller 190. Then, the controller 190 may determine the type of touch input using the touch recognition algorithm, the touch pattern data, etc. stored in the memory 150 based on the received signal values or user input information. In addition, when a telephony application is executed, for example, the controller 190 may detect that a call button of the telephony application is selected based on the user input information or the type of touch input, and request the communicator 140 to make a call.

The motion sensor 182 may detect a motion (for example, rotation, tilting and the like) of the user terminal device 100 using sensors. For example, at least one of an acceleration sensor, a tilt sensor, a gyro sensor, and a 3-axis magnetic sensor may be used to detect a motion of the user terminal device 100. The motion sensor 182 may transmit an electric signal to the controller 190. For example, when the acceleration sensor is used, the motion sensor 182 may measure gravitational acceleration of the user terminal device 10 with reference to each of the X-axis, Y-axis, and Z-axis. The motion sensor 182 may measure motion acceleration and gravitational acceleration of the user terminal device 10. When there is no motion in the user terminal device 10, only the gravitational acceleration may be measured.

Assume that the gravitational acceleration is a positive (+) value when the user terminal device 10 is placed with its front surface up, and the gravitational acceleration is a negative (−) value when the user terminal device 10 is placed with its rear surface up. When the user terminal device 10 is placed with its rear surface contacting the plane surface, the X-axis and Y-axis components of the gravitational acceleration measured by the motion sensor 182 may be 0 m/sec$^2$, and the Z-axis component may be a specific positive value (for example, +9.8 m/sec$^2$). On the other hand, when the user terminal device 10 is placed with its front surface contacting the plane surface, the X-axis and Y-axis components of the gravitational acceleration measured by the motion sensor 182 may be 0 m/sec$^2$, and the Z-axis component may be a specific negative value (for example, −9.8 m/sec$^2$).

If the user terminal device 10 is placed obliquely with respect to the surface of a table, at least one axis component of the gravitational acceleration measured by the motion sensor 182 may be a value other than 0 m/sec2. The value may be a square root of a sum of squares of the three axis components, i.e., a vector sum (for example, 9.8 m/sec$^2$). In an exemplary embodiment in which the motion sensor 182 detects the acceleration for each of the X-axis, Y-axis, and Z-axis directions on the coordinate system, the axes and gravitational acceleration measured for the axes may vary according to a location where the sensor is attached.

The bending sensor 183 may detect the bending state of the user terminal device 10 using one or more sensors. For example, at least one of a tack switch, a motion detection sensor, and a pressure sensor may be used to detect the bending state.

The bending sensor 183 may periodically transmit a value measured by the detection sensor or the bending state of the user terminal device 10 derived from the measured value to the controller 190. The bending sensor 183 may transmit the measured value or the bending state to the controller 190 based on a result of comparison between the measured value and a specific threshold value, or based on a specific event.

In an exemplary embodiment, two tack switches may be used to implement the bending sensor 183. In this case, the bending angle of the user terminal device 10 may be determined based on whether each of the two tack switches is in on state or an off state. In addition, the bending speed of the user terminal device 10 may be measured based on the time taken for the two tack switches to change from the on state to the off state or change from the off state to the on state. In addition, the bending holding time of the user terminal device 10 may be measured based on how long the on or off state of each of the two tack switches is maintained.

In another exemplary embodiment, two motion detection sensors may be used to implement the bending sensor 183. In this case, one of the motion detection sensors may be located on the upper portion of the user terminal device 10 with reference to a bending axis, whereas the other may be located on the lower portion of the user terminal device 10. The motion detection sensor may include one or more various types of sensors. For example, the motion detection sensor may include at least one of an acceleration sensor, a tilt sensor, a gyro sensor, and a magnetic field sensor. The bending angle of the user terminal device 10 may be measured according to an angle value detected by the motion detection sensor. In addition, the bending speed of the user terminal device 10 may be measured according to a speed value measured by the motion detection sensor. Also, the bending holding time of the user terminal device 10 may be measured based on a time when a displacement value detected by the motion detection sensor is generated.

In another exemplary embodiment, a pressure sensor may be used to implement the bending sensor 183. In this case, the bending angle of the user terminal device 10 may be measured based on the intensity of a pressure applied to the pressure sensor. In addition, the bending speed of the user terminal device 10 may be detected based on a speed of a change in the pressure applied to the pressure sensor. In addition, the bending holding time of the user terminal device 10 may be measured based on a time during which the pressure applied to the pressure sensor is maintained.

In another exemplary embodiment, the bending sensor 183 may detect the bending state of the user terminal device 10 based on a capacitor value or a resistor value of the touch panel which is acquired by the touch sensor 181. For example, the bending angle of the user terminal device 10 may be measured based on the capacitor value or the resistor value of a bent portion of the touch panel. In addition, the bending speed of the user terminal device 10 may be measured based on a speed of a change in the capacitor value or the resistor value. In addition, the bending holding time of the user terminal device 10 may be measured based on a time when there is a change in the capacitor value or the resistor value.

The controller 190 controls the overall operations of the user terminal device 10 using various programs stored in the memory 150.

As shown in FIG. 3, the controller 190 according to an exemplary embodiment may include a Random Access Memory (RAM) 191, a Read Only Memory (ROM) 192, a graphic processor 193, a main CPU 194, first to nth interfaces 195-1 to 195-n, and a bus 196. The RAM 191, the ROM 192, the graphic processor 193, the main CPU 194, and the first to nth interfaces 195-1 to 195-n may be connected with one another via the bus 196.

The ROM 192 may store a set of commands for booting a system. When the user terminal device 10 is turned on and power is supplied, the main CPU 194 copies an O/S stored in the memory 150 onto the RAM 191 according to the command stored in the ROM 192, executes the O/S and boots the system. When booting is completed, the main CPU 194 copies various application programs stored in the memory 150 onto the RAM 191, executes the application programs copied onto the RAM 191, and performs various operations.

The graphic processor 193 generates a screen including a variety of information such as an item, an image, a text, and the like, using a calculator and a renderer. The calculator calculates attribute values of the information to be displayed, such as coordinate values, shape, size, color, and the like of the information according to the layout of the screen using a control command received from the sensor unit 180. The renderer generates the screen of various layouts including the information based on the attribute values calculated by the calculator. The screen generated by the renderer is displayed on a display area of the display 130.

The main CPU 194 accesses the memory 150 and performs booting using the O/S stored in the memory 150. In addition, the main CPU 194 performs various operations using various programs, contents, and data stored in the memory 150.

The first to nth interfaces 195-1 to 195-n are connected with the above-described various elements. One of the interfaces may be a network interface which provides connectivity with an external device through a network.

The controller 190 controls the display 130 to display information on the first area while the user terminal device 100 is maintained in a bent state based on the detected bending state, and, in response to the user terminal device 100 changing from the bent state to an unbent state, controls the display 130 not to display the information on the first area FIGS. 5A to 7 illustrates bending the user terminal device 10 according to an exemplary embodiment.

In the exemplary embodiment which will be explained with reference to FIGS. 5A to 7, the scenario is as follows. Initially, the user terminal device 10 is in an unbent state and then gets bent increasingly in response to an external pressure. Thereafter, as the external pressure is removed while the user terminal device 10 is bent by less than predetermined curvature or a predetermined angle, the user terminal device 10 may return to its previous state, i.e., unbent state. Hereinafter, the state from which the user terminal device 10 can return to its previous state in response to an external pressure being removed will be referred to as a pre-bending state. On the other hand, if the external pressure is continuously applied such that the user terminal device 10 is bent by more than the predetermined curvature or the predetermined angle, the user terminal device 10 may maintain its bent state even after the external pressure is removed. Hereinafter, the state in which the user terminal device 10 stays bent even when there is no external pressure being applied to the user terminal device 10 will be referred to as a step-bending. For example, the predetermined angle may be, but is not limited to, one between about 10 degrees and 25 degrees. The predetermined angle may vary according to elasticity of an elastic part for returning to its original state or a degree of abrasion. For example, the pressure for maintaining the user terminal device 10 in the pre-bending state may be, but is not limited to, about 0.9 kfg/cm$^2$. In addition, the pressure for returning the user terminal device 10 from the step-bending state to the pre-bending state or an unbent state may be, but is not limited to, about 1.3 kfg/cm$^2$.

Meanwhile, in response to an external pressure being applied by a user's finger, the user terminal device 10 may operate to prevent misoperation by the user. For example, while the user terminal device 10 is in the unbent state, the flexible display 20 may be in an inactivation state such that the user terminal device 10 may not process a touch input on the flexible display 20. Thereafter, in response to external pressure being applied until the user terminal device 10 enters the pre-bending state, the user terminal device 10 may control the flexible display 20 to activate the first area 20-1. For example, the user terminal device 10 may control the flexible display 20 to activate the first area 20-1 and display a received message on the first area 20-1. In this case, even though the first area 20-1 of the flexible display 20 is activated, the user terminal device 10 may not process a user touch input. Next, in response to the external pressure being continuously applied such that the user terminal device 10 enters the step-bending state, the user terminal device 10 may activate the second area 20-2. For example, the user terminal device 10 may control the flexible display 20 to display a message input screen on the first area 20-1 and to display a keypad for entering a message on the second area 20-2. In this case, the user terminal device 10 may control the flexible display 20 to process a user input on the flexible display 20. That is, the user terminal device 10 may control the flexible display 20 to receive a message input through the keypad displayed on the second area 20-2.

Figure 5A:
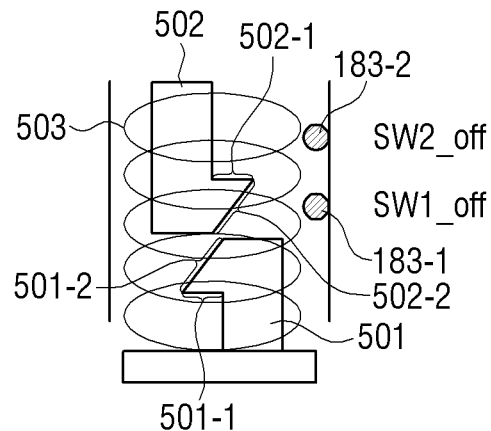
FIGS. 5A to 5B illustrate a bending part of a user terminal device according to an exemplary embodiment.
Figure 5A:
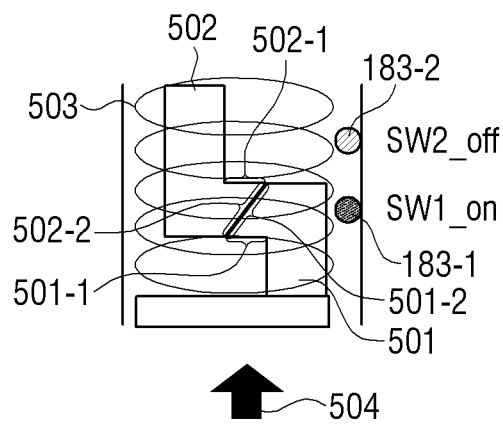
Figure 5A:
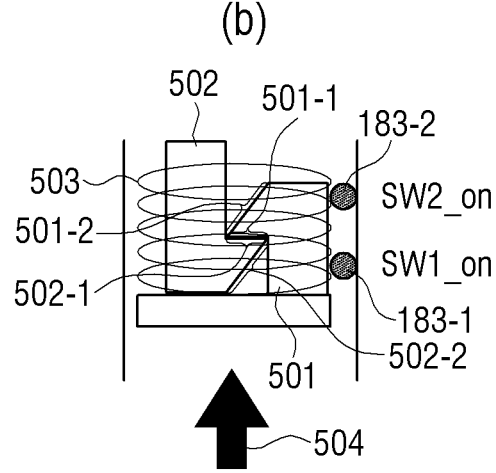

FIG. 5A illustrates a structure of a bending part of the user terminal device 10 according to an exemplary embodiment.

As shown in FIG. 5A, the bending part 30 of the user terminal device 10 may include a first securing part 501, a second securing part 502, and an elastic part 503 (for example, a cylindrical spring, a leaf spring, etc.). In addition, the user terminal device 10 may further include a first bending detection part 183-1 and a second bending detection part 183-2 for detecting the bending state of the bending part 30.

View (a) of FIG. 5A illustrates an unbent state before the user terminal device 10 is bent. In the unbent state, a first locking part 501-1 of the first securing part 501 and a second locking part 502-1 of the second securing part 502 may be disengaged from each other. In this state, when the detection sensor of the first bending detection part 183-1 and the detection sensor of the second bending detection part 183-2 are tack switches for detecting pressing or contact, the detection sensors may be operated in the off state.

Next, as an external pressure 504 is applied until the user terminal device 10 is bent by less than predetermined curvature or a predetermined angle, the first securing part 501 and the second securing part 502 may be moved such that a first sliding part 501-2 of the first securing part 501 and a second sliding part 502-2 of the second securing part 502 contact with each other. At this point, the user terminal device 10 may return to its original state, that is, the unbent state, if the external pressure 504 is removed. That is, due to the restoring force of the elastic part 503, the first securing part 501 and the second securing part 502 may be moved such that the first sliding part 501-2 and the second sliding part 502-2 slide and are disengaged from each other. In this case, the first securing part 501 and the second securing part 502 may return to the unbent state as shown in view (a) of FIG. 5A.

In the pre-bending state shown in view (b) of FIG. 5A, the detection sensor of the first bending detection part 183-1 may detect the pressing or contact by the second securing part 502 and may be operated in the on state. As a result, the first bending detection part 183-1 may transmit a detection signal of the second securing part 502 to the controller 190. In response to the detection signal of the second securing part 502 being received, the controller 190 may determine that the user terminal device 10 is in the pre-bending state and control the flexible display 20 to display information on the first area 20-1 of the flexible display 20. For example, the first area 20-1 of the flexible display 20 may be activated and display a receive message if the user terminal device 10 enters the pre-bending state from the unbent state.

If the external pressure 504 is continuously applied until the user terminal device 10 is bent by more than the predetermined curvature or the predetermined angle, as shown in view (c) of FIG. 5A, the first securing part 501 and the second securing part 502 may be moved such that the first sliding part 501-2 and the second sliding part 502-2 slide further in opposite directions and the first locking part 501-1 and the second locking part 502-1 are brought into contact with each other. In this case, the user terminal device 10 may be maintained in the bent state even when the external pressure is removed. That is, the securing force between the first locking part 501-1 and the second locking part 502-1 is stronger than the restoring force of the elastic part 503, so that the user terminal device 10 can be maintained in the bent state.

In the step-bending state shown in view (c) of FIG. 5A, the detection sensor of the first bending detection part 183-1 may detect the contact by the first securing part 501, and the detection sensor of the second bending detection part 183-2 may detect the contact by the second securing part 502, and thus both the first bending detection part 183-1 and the second bending detection part 183-2 may be operated in the on state. As a result, the first bending detection part 183-1 and the second bending detection part 183-2 may transmit detection signals of the first securing part 501 and the second securing part 502 to the controller 190. In response to receiving the detection signals of the first securing part 501 and the second securing part 502 within a predetermined time (for example, 0.2 to 1 second), the controller 190 may determine that the user terminal device 10 is in the step-bending state and control the flexible display 20 to display another information on the first area 20-1 of the flexible display 20. In other words, the first area 20-1 of the flexible display 20 may display a text message input window if the user terminal device 10 enters the step-bending state from the step-bending state.

Figure 6:
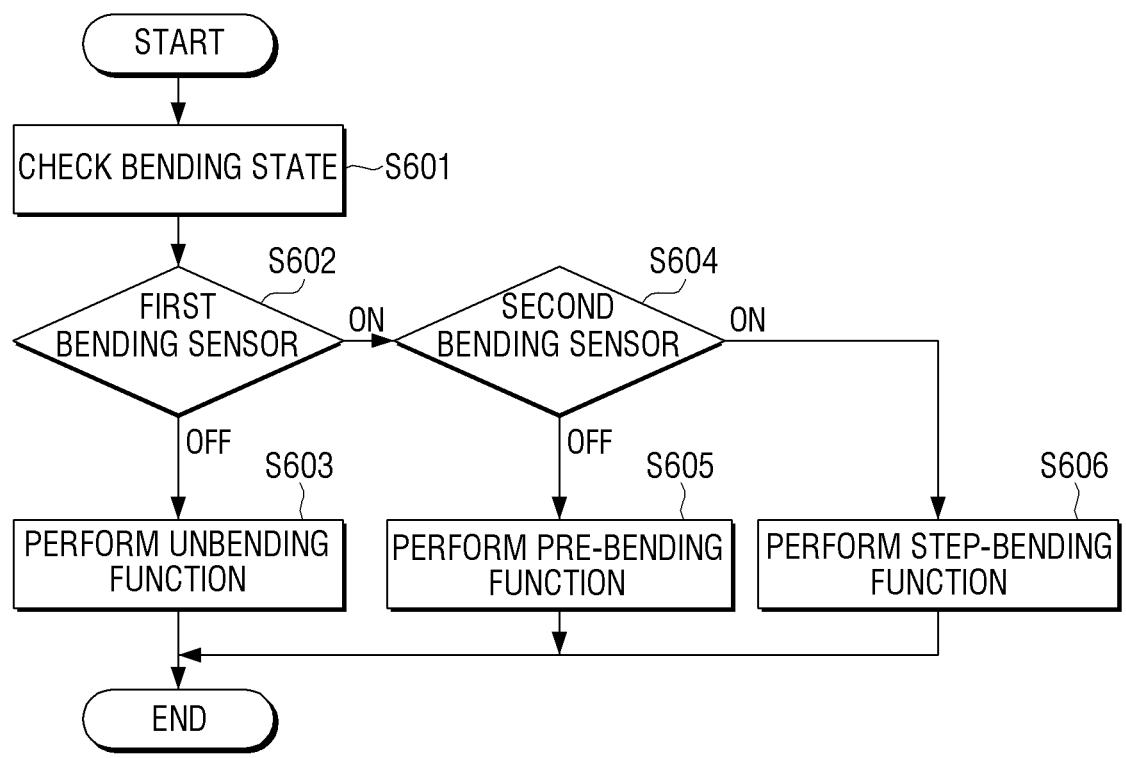
FIG. 6 is a flowchart illustrating a method of detecting a bending state according to an exemplary embodiment.

FIG. 6 is a flowchart showing the operation of the user terminal device 10 based on a bending state detected by the bending sensor 183 of FIG. 5A.

In S601, the controller 190 may check the bending state of the user terminal device 10. That is, the user terminal device 10 may monitor whether bending detection signals are received from the first bending detection part and the second bending detection part.

In S602, the user terminal device 10 may determine whether the detection sensor of the first bending detection part is in the on state or in the off state. If the detection sensor of the first bending detection part is in the off state (S602-OFF), the controller 190 may determine that the user terminal device 10 is in the unbent state and thus perform a function corresponding to the unbent state in S603.

On the other hand, if the detection sensor of the first bending detection part is in the on state (S602-ON), the controller 190 may determine whether the detection sensor of the second bending detection part is in the on state or in the off state in S604.

If the detection sensor of the second bending detection part is in the off state (S604-OFF), the controller 190 may determine that the user terminal device 10 is in the pre-bending state and perform a function corresponding to the pre-bending state in step S605.

On the other hand, if the detection sensor of the second bending detection part is in the on state (S604-ON), the controller 190 may determine that the user terminal device 10 is in the step-bending state and thus perform a function corresponding to the step-bending state in S606.

Figure 5B:
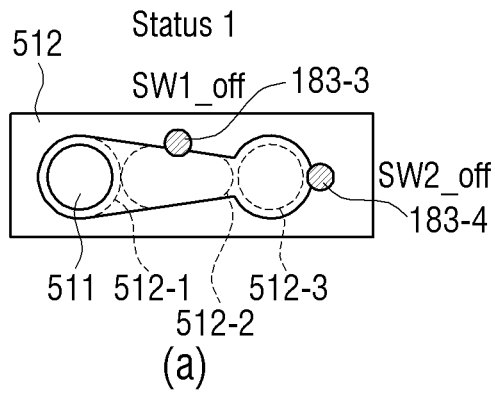
Figure 5B:
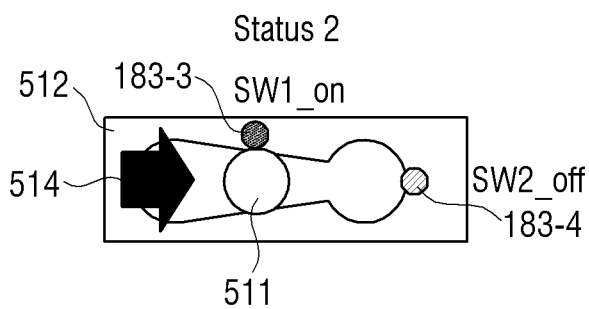
Figure 5B:
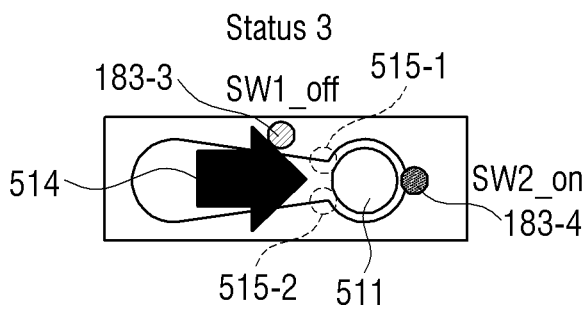

FIG. 5B illustrates a structure of a bending part of the user terminal device 10 according to another exemplary embodiment.

In FIG. 5B, the bending part 30 of the user terminal device 10 may include a bending shaft 511 and a rod 512. In addition, the user terminal device 10 may further include a first bending detection part 183-3 and a second bending detection part 183-4 to detect the bending state of the bending part 30. For example, the rod 512 may be implemented using an elastic material.

View (a) of FIG. 5B illustrates an unbent state of the user terminal device 10. In the unbent state, the bending shaft 511 may be located in a first locking area 512-1. If the detection sensor of the first bending detection part 183-3 and the detection sensor of the second bending detection part 183-4 are implemented with tack switches for detecting pressing or contact, the detection sensors may be operated in the off state in the unbent state.

If an external pressure 514 is applied such that the user terminal device 10 is bent by less than predetermined curvature or a predetermined angle, the bending shaft 511 slides from the first locking area 512-1 toward a second locking area 512-3 along a slide section 512-2 as shown in view (b) of FIG. 5B. In this case, if the external pressure being removed, the user terminal device 10 may return to its original state, that is, the unbent state. That is, due to the restoring force of the rod 512, the bending shaft 511 may slide back to the first locking area 512-1 along the sliding section 512-2.

In the pre-bending state shown in view (b) of FIG. 5B, the detection sensor of the first bending detection part 183-3 may detect the pressing or contact by the bending shaft 511, and thus may be operated in the on state. As a result, the first bending detection part 183-3 may transmit a detection signal of the bending shaft 511 to the controller 190. In response to receiving the detection signal of the bending shaft 511, the controller 190 may determine that the user terminal device 10 is in the pre-bending state and control the flexible display 20 to display information on the first area 20-1 of the flexible display 20. In other words, the first area 20-1 of the flexible display 20 may be activated and display a received message if the user terminal device 10 enters the pre-bending state from the unbent state.

If the external pressure 514 is continuously applied until the user terminal device 10 is bent by more than the predetermined curvature or the predetermined angle, the bending shaft 511 may continuously slide along the slide section 512-2 and is located in the second locking area 512-3 as shown in view (c) of FIG. 5B. In this step-bending state, the user terminal device 10 may not return to the unbent state even if the external pressure is removed. That is, the bending shaft 511 is locked in the second locking area 512-3 due to the presence of projections 515-1 and 515-2 formed on the second locking area 512-3, such that the user terminal device 10 may stay in the bent state even when the external pressure is removed.

In the step-bending state shown in view (c) of FIG. 5B, the detection sensor of the second bending detection part 183-4 may detect the pressing or contact by the bending shaft 511, and thus may be operated in the on state. As a result, the second bending detection part 183-4 may transmit a detection signal of the bending shaft 511 to the controller 190. In response to the controller 190 receiving the detection signal of the bending shaft 511, the controller 190 may determine that the user terminal device 10 is in the step-bending state and control the flexible display 20 to display another information on the first area 20-1 of the flexible display 20. In other words, the first area 20-1 of the flexible display 20 may display a text message input window if the user terminal device 10 enters the step-bending state from the pre-bending state.

Figure 7:
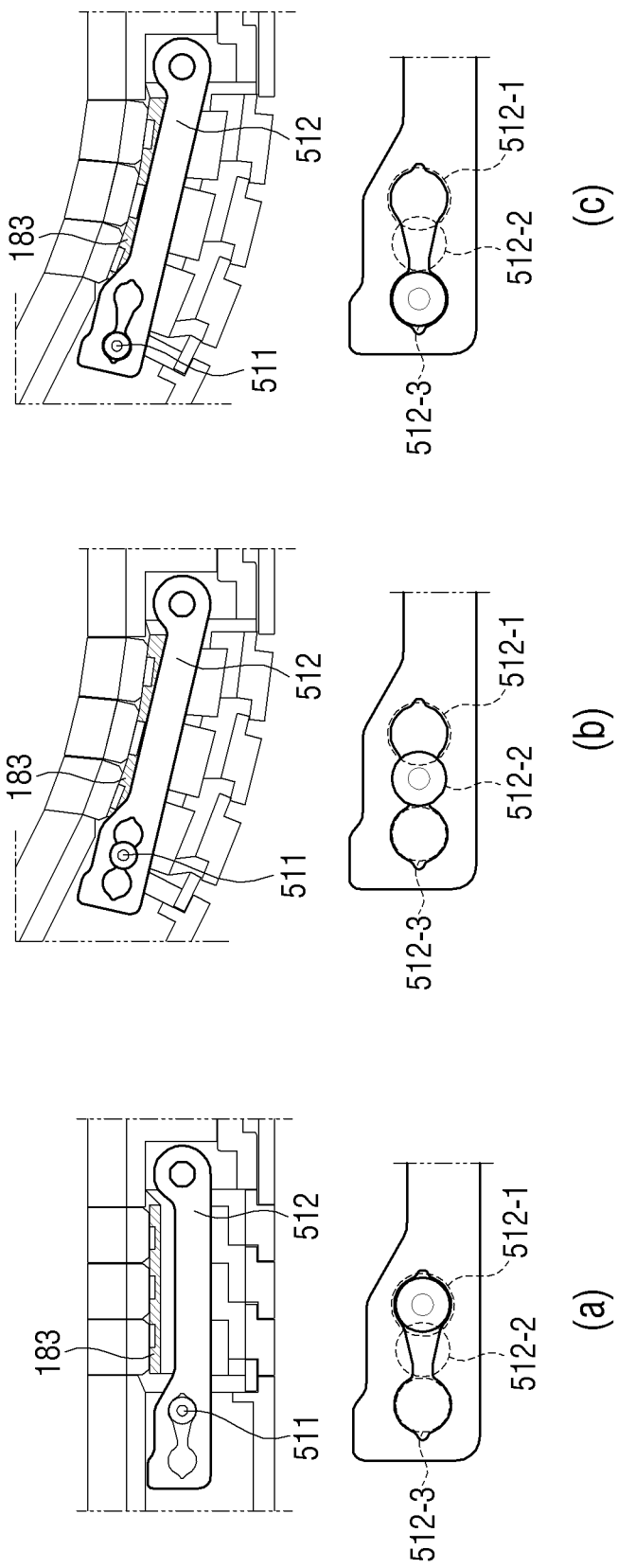
FIG. 7 illustrates operations of a bending part of a user terminal device according to an exemplary embodiment.

FIG. 7 illustrates operations of the bending part of the user terminal device 10 according to an exemplary embodiment.

In FIG. 7, the bending part 30 of the user terminal device 10 may include a bending shaft 511 and a rod 512. In addition, the user terminal device 10 may include a bending sensor 183 to detect the bending states of the bending part 30. Herein, the detection sensor of the bending sensor 183 may be a pressure sensor (for example, a strain gage) and may correspond to a shaded portion in FIG. 7. The pressure sensor may measure a change in a resistance value which results from the bending of the user terminal device 10. As a result, an event signal indicating the resistance value or the change in the resistance value may be transmitted to the controller 190. The controller 190 may determine whether the user terminal device 10 is in the unbent state, the pre-bending state, or the step-bending state based on the received event signal. The bending part 30 may further include an elastic part which enables the user terminal device 10 to return to the unbent state from the pre-bending state automatically without further external forces.

Figure 8A:
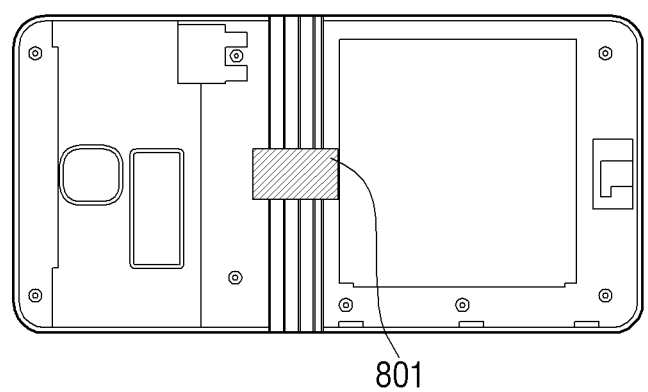
FIGS. 8A to 8C illustrate an elastic part of a bending part according to an exemplary embodiment.
Figure 8A:
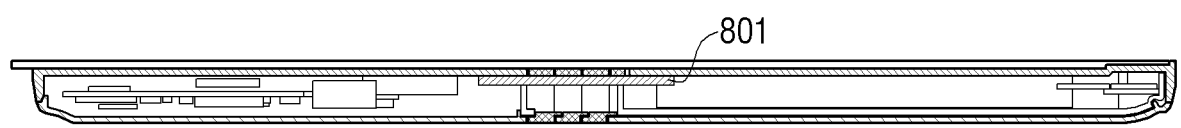
Figure 8A:
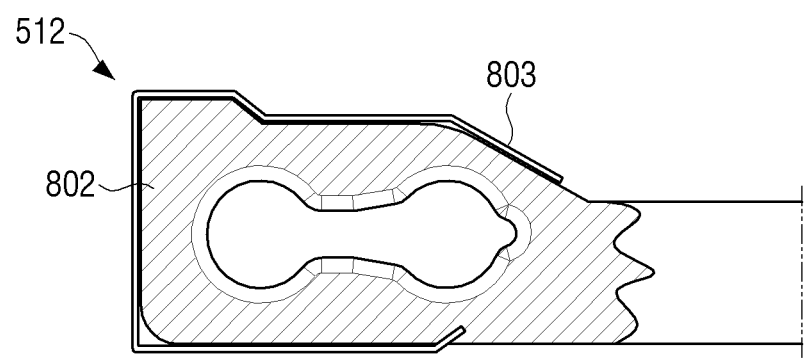
Figure 8B:
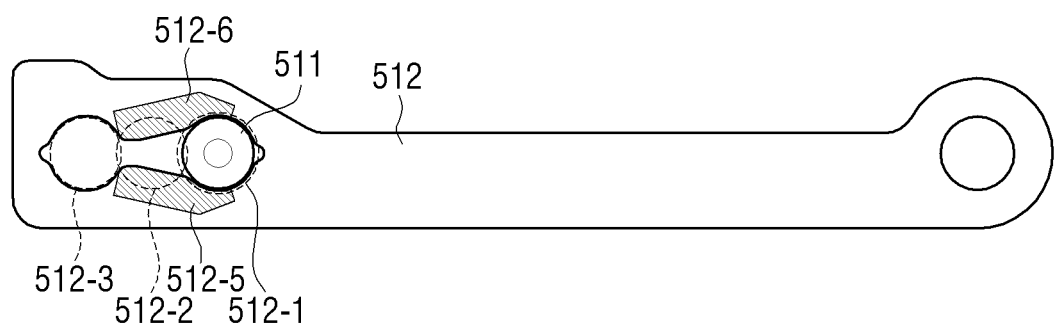
Figure 8C:
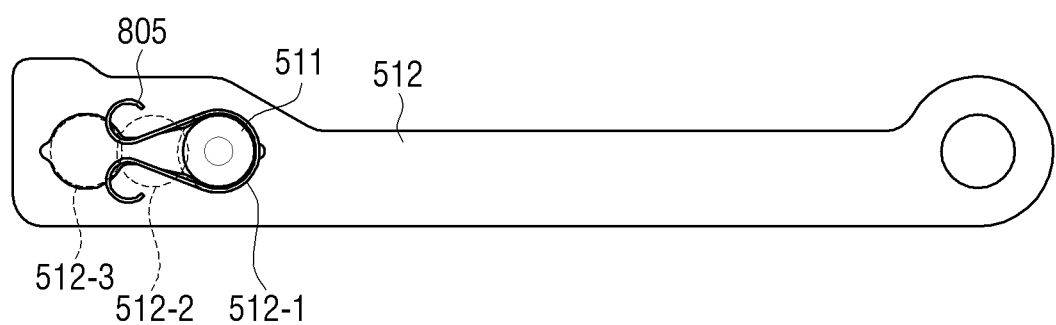

FIGS. 8A to 8C illustrate an elastic part of the bending part according to an exemplary embodiment.

In FIG. 8A, the elastic part is a leaf spring 801. The leaf spring 801 has the advantage of being easily connected to the user terminal device 10. View (a) of FIG. 8A illustrates the user terminal device 10 having the leaf spring 801 mounted thereon, as viewed from the front. View (b) of FIG. 8A illustrates the user terminal device 10 having the leaf spring 801 mounted thereon, as viewed from the side. Since the restoring force of the leaf spring 801 is strong, a special structure for reinforcing the locking of the bending shaft 511 may be required. For example, as shown in view (c) of FIG. 8A, the periphery 802 of the area where the bending shaft 511 is moved in the rod 512 may be made of metal material, thereby reinforcing the force for locking the bending shaft 511. Moreover, a reinforcing element 803 may be additionally mounted on the periphery of the area where the bending shaft 511 is locked in the rod 512, thereby further reinforcing the force for locking the bending shaft 511.

As shown in FIG. 8B, parts 512-5 and 512-6 of the rod 512 may serve as the elastic part. In this case, the bending shaft 511 located in the slide section 512-2 of the rod 512 may be automatically moved to the first locking area 512-1 by the restoring force of the elastic parts 512-5 and 512-6, if there are no other external forces.

As shown in FIG. 8C, the elastic part may be implemented using a pin spring 805 which is mounted on the periphery of the slide section 512-2 and the first locking area 512-1. In this case, the bending shaft 511 located in the slide section 512-2 of the rod 512 may be automatically moved to the first locking area 512-1 by the restoring force of the pin spring 805, if there are no other external forces. Using the pin spring 805 has an advantage that the restoring force may be adjusted easily (for example, by the thickness of the spring).

Referring back to FIG. 7, view (a) of FIG. 7 illustrates the bending part when the user terminal device 10 is in the unbent state.

In the unbent state, the bending shaft 511 may be located in the first locking area 512-1 of the rod 512. Thus, the bending sensor 183 may detect the unbent state of the user terminal device 10 and transmit a signal indicating the unbent state to the controller 190.

View (b) of FIG. 7 illustrates the bending part when the user terminal device 10 is in the pre-bending state in which the user terminal device 10 is bent by less than predetermined curvature or a predetermined angle.

In the pre-bending state, the bending shaft 511 may be located in the slide section 512-2. In this case, in response to the external pressure being removed, the user terminal device 10 may return to the unbent state from the pre-bending state. That is, the bending shaft 511 may return to the first locking area 512-1 automatically if there are no other external forces. In this pre-bending state, the bending sensor 183 may detect the pre-bending state of the user terminal device 10 and transmit a signal indicating the pre-bending state to the controller 190.

View (c) of FIG. 7 illustrates the bending part when the user terminal device 10 is in the step-bending state in which the user terminal device 10 is bent by more than the predetermined curvature or the predetermined angle.

In the step-bending state, the bending shaft 511 may be located in the second locking area 512-3 of the rod. In this case, the user terminal device 10 may stay in the bent state even after the external pressure is removed. That is, the bending shaft 511 may not return to the first locking area 512-1 without any further external forces. In this step-bending state shown in view (c) of FIG. 7, the bending sensor 183 may detect the step-bending state and transmit a signal indicating the step-bending state to the controller 190.

FIGS. 9 to 14C illustrate displaying information on the flexible display in response to the user terminal device 10 changing from an unbent state to a pre-bending state according to an exemplary embodiment.

Figure 9:
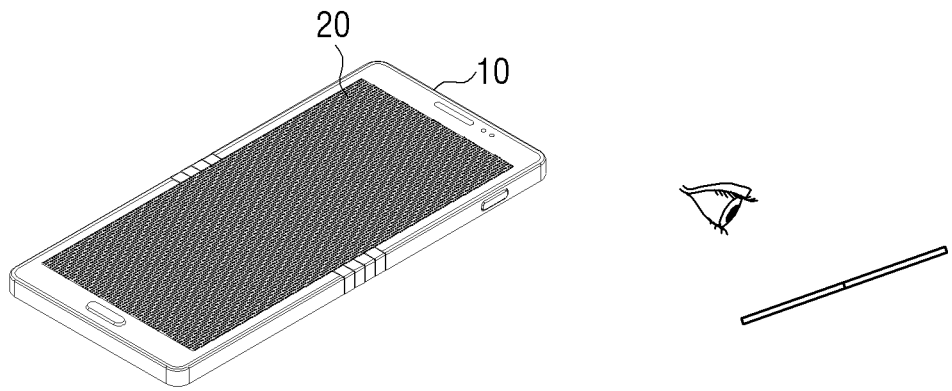
FIG. 9 illustrates a screen displaying information on a flexible display as an bending states changes between an unbent state and a pre-bending state according to an exemplary embodiment.
Figure 9:
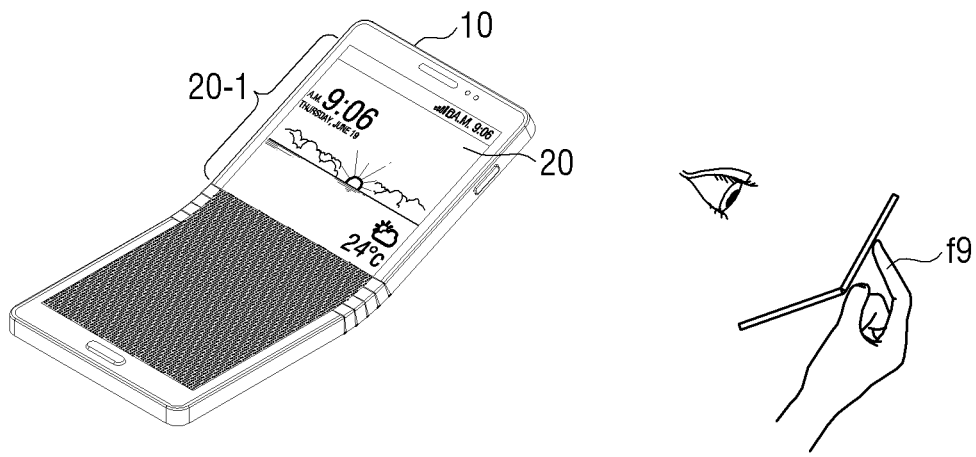
Figure 9:
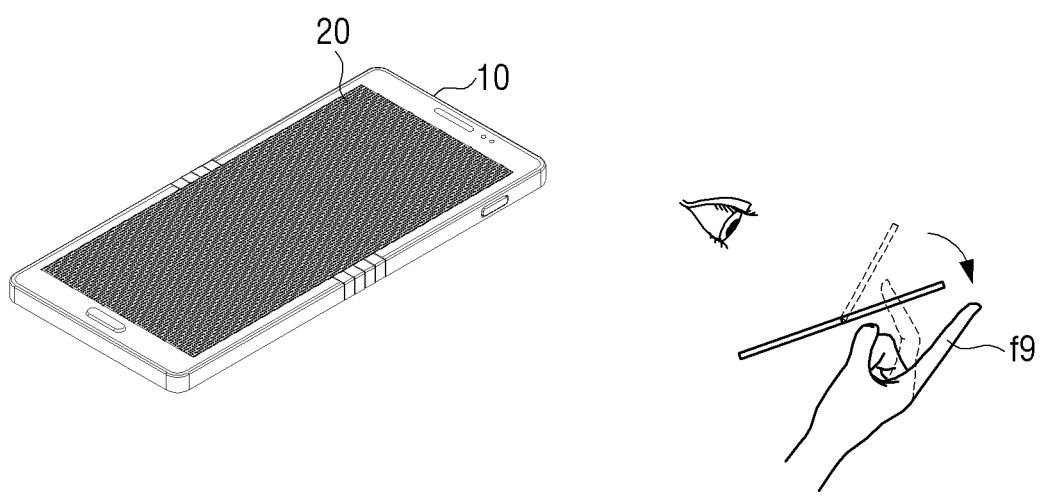

In view (a) of FIG. 9, the user terminal device 10 is in the unbent state. In the unbent state, the flexible display 20 of the user terminal device 10 may be in an inactivation state, e.g., in a sleep mode. At this point, external pressure may be applied to the user terminal device 10. For example, the external pressure may be a force pushing the upper portion of the rear surface of the user terminal device 10 forward using a finger f9.

In response to the external pressure being applied, the user terminal device 10 may change from the unbent state to a pre-bending state which is shown in view (b) of FIG. 9. In this pre-bending state, the user terminal device 10 may control the flexible display 20 to display information on the first area 20-1 while the external pressure is being applied to keep the user terminal device 10 from returning back to the unbent state. Specifically, the user terminal device 10 may control the flexible display 20 to change from the inactivation state to an activation state, and further display information on the activated first area 20-1. For example, the information may be time information or weather information, for example.

Next, in the pre-bending state of the user terminal device 10, the external pressure applied to the user terminal device 10 may be removed. For example, the user may stop pushing the upper portion of the rear surface of the user terminal device 10 using the finger f9.

In response to the external pressure being removed, the user terminal device 10 may change from the pre-bending state back to the unbent state as shown in view (c) of FIG. 9. As a result, the user terminal device 10 may control the flexible display 20 not to display the information which was displayed in the pre-bending state on the first area 20-1 of the flexible display 20. For example, the user terminal device 10 may change the first area 20-1 to the inactivation state. In response to the first area 20-1 being changed to the inactivation state, the information displayed on the first area 20-1 may automatically disappear. Otherwise, the first area 20-1 may display different information, staying in the activation state. In other words, as the bending state returns from the pre-bending state to the unbent state, the information displayed on the first area 20-1 may be changed and/or first area 20-1 may be inactivated.

Figure 10:
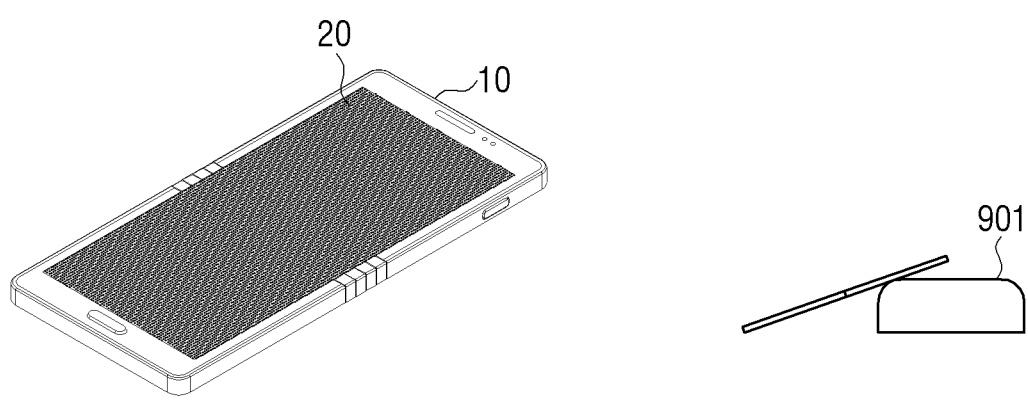
FIG. 10 illustrates a screen displaying information on a flexible display as a bending state changes between an unbent state and a pre-bending state according to another exemplary embodiment.
Figure 10:
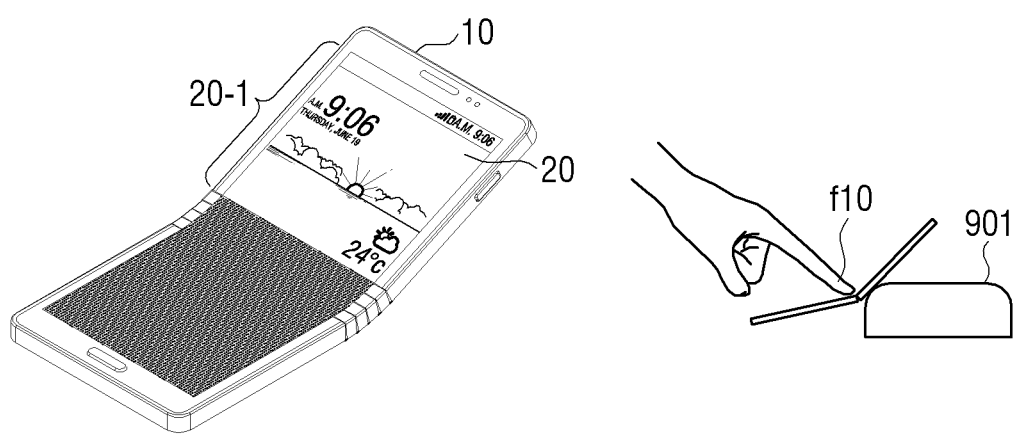
Figure 10:
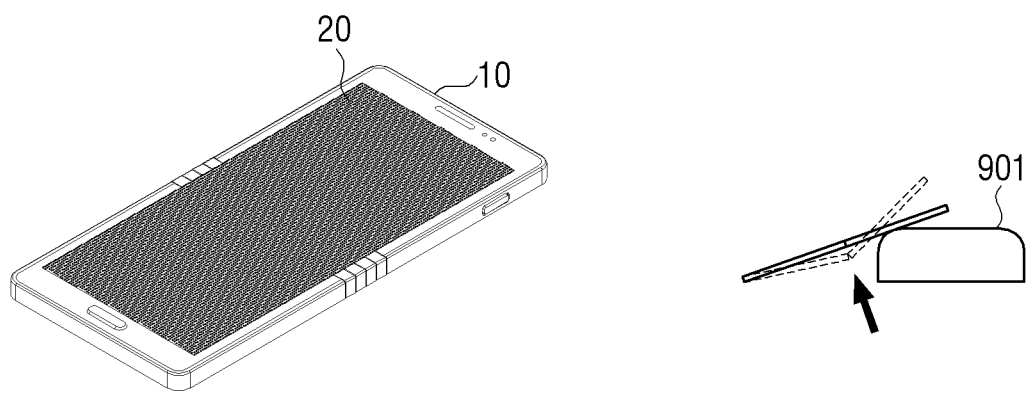

According to another exemplary embodiment, an external pressure may be applied to the user terminal device 10 in the unbent state of the user terminal device 10 as shown in view (a) of FIG. 10.

For example, the external pressure may be a force pushing the front surface of the user terminal device 10 forward using a finger fill while the user terminal device 10 is leaned against a stand 901 as shown in view (b) of FIG. 10. In response to the external pressure being applied, the user terminal device 10 may change from the unbent state to the pre-bending state. As a result, the user terminal device 10 may control the flexible display 20 to display information on the first area 20-1 while the external pressure is being applied to keep the user terminal device 10 from returning back to the unbent state, as shown in view (b) of FIG. 10. For example, the information may be, but is not limited to, time information and weather information as shown in view (b) of FIG. 10.

Next, while the user terminal device 10 is in the bent state, the external pressure may be removed. For example, the user may stop pushing the front surface of the user terminal device 10 leaned against the stand 901 using the finger f10. In response to the external pressure being removed, the user terminal device 10 may change from the pre-bending state back to the unbent state as shown in view (c) of FIG. 10. As a result, the user terminal device 10 may control the flexible display 20 not to display the time information and the weather information which was displayed in the pre-bending state on the first area 20-1 of the flexible display 20 as shown in view (b) of FIG. 10. For example, the user terminal device 10 may change the first area 20-1 to the inactivation state. In response to the first area 20-1 being changed to the inactivation state, the information displayed on the first area 20-1 may automatically disappear. Otherwise, the first area 20-1 may display different information, staying in the activation state. In other words, as the bending state returns from the pre-bending state to the unbent state, the information displayed on the first area 20-1 may be changed and/or first area 20-1 may be inactivated.

Figure 11:
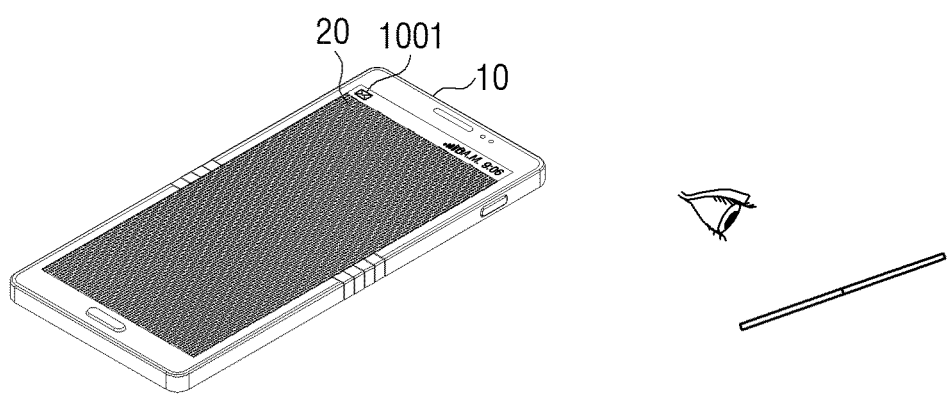
FIG. 11 illustrates a screen displaying information on a flexible display as a bending state changes between an unbent state and a pre-bending state according to yet another exemplary embodiment.
Figure 11:
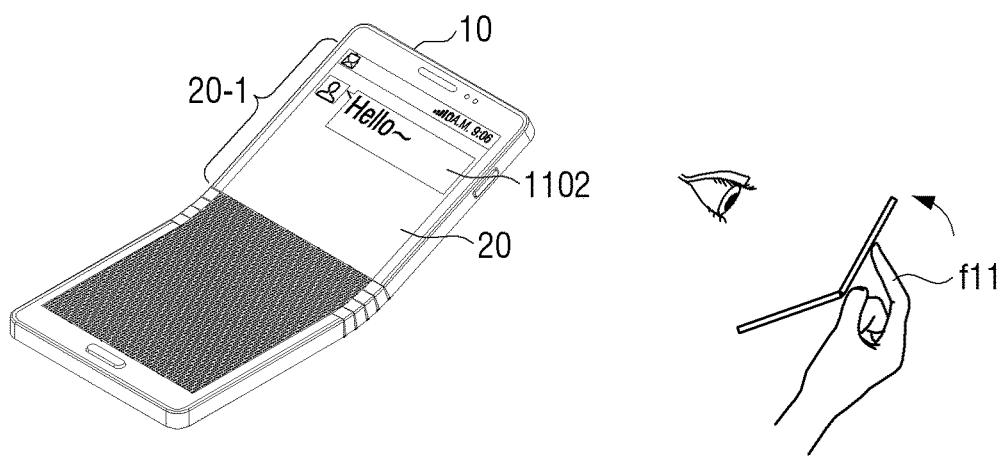
Figure 11:
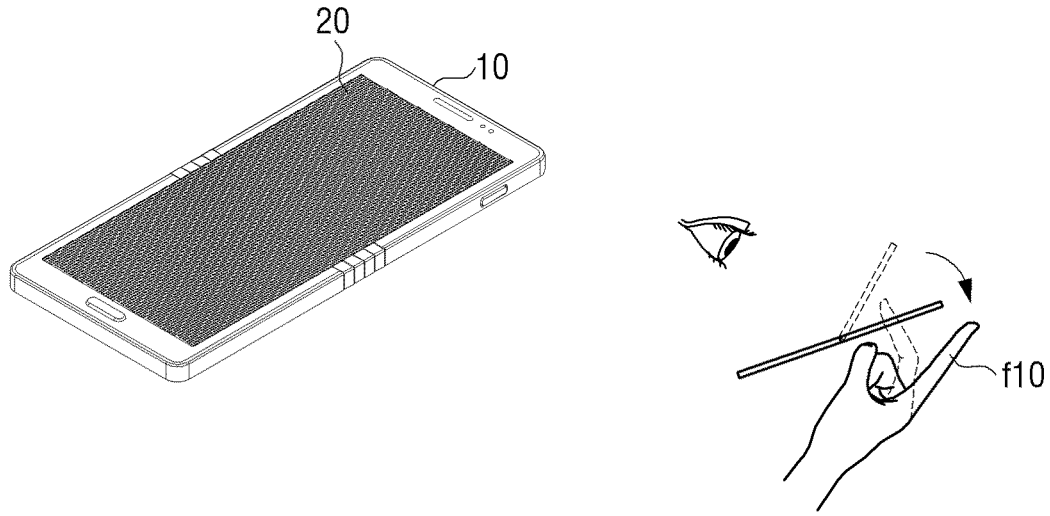

According to another exemplary embodiment, the user terminal device 10 may be in the unbent state as shown in view (a) of FIG. 11. In response to a message being received in the unbent state, the user terminal device 10 may control the flexible display 20 to display an icon 1001 of the message or a part of the message on a certain area (for example, an upper area) of the flexible display 20.

If an external pressure is applied to the user terminal device 10 in the unbent state, the user terminal device 10 may change from the unbent state to the pre-bending state as shown in view (b) of FIG. 11. In the pre-bending state, the user terminal device 10 may control the flexible display 20 to display the message 1102 on the first area 20-1 while the external pressure is maintained to keep the user terminal device 10 from returning back to the unbent state. A part or all of the contents of the received message may be displayed on the first area 20-1 of the flexible display 20.

At this point, if the external pressure is removed, the user terminal device 10 may change from the pre-bending state back to the unbent state as shown in view (c) of FIG. 11. As the user terminal device 10 returns to the unbent state, the flexible display 20 is controlled not to display the message on the first area 20-1 anymore. In other words, the user terminal device 10 may control the flexible display 20 not to display a part or all of the message which has been displayed on the flexible display 20 in the pre-bending state. Further, the user terminal device 10 may control the flexible display 20 not to display the message icon 1001.

Figure 12:
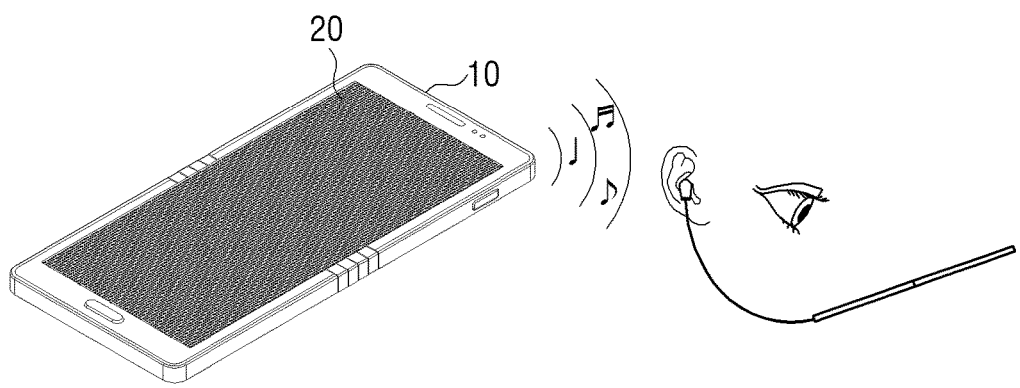
FIG. 12 illustrates a screen displaying information on a flexible display as a bending state changes between an unbent state and a pre-bending state according to yet another exemplary embodiment.
Figure 12:
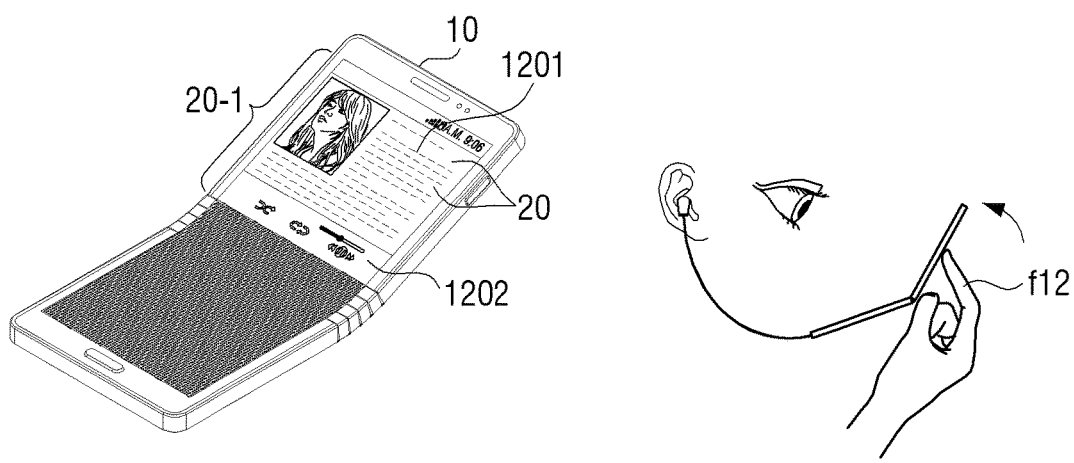
Figure 12:
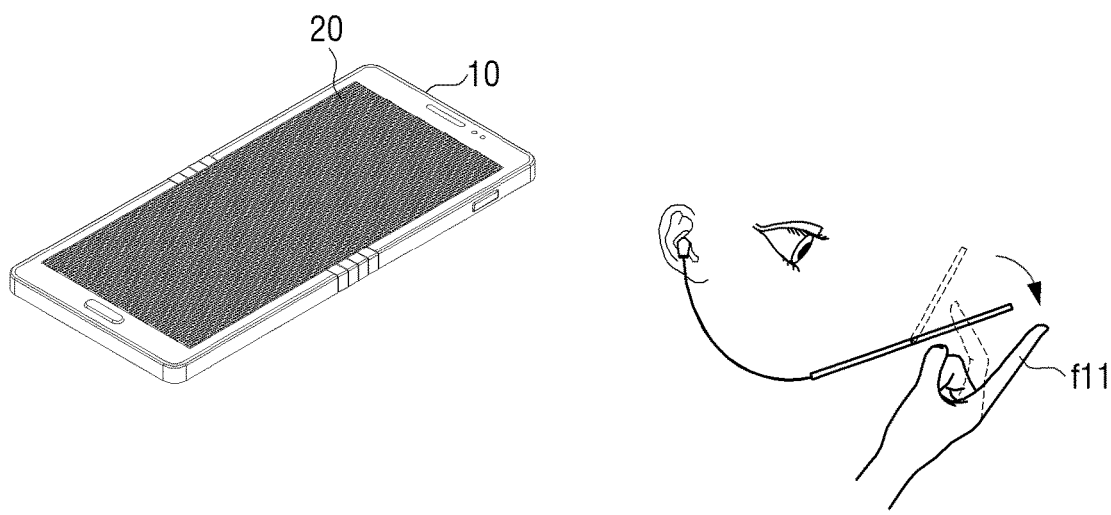

According to another exemplary embodiment, the user terminal device 10 may execute a music application in the unbent state as shown in view (a) of FIG. 12. While listening to music, if the user wishes to know information on the music, the user pushes the upper portion of the rear surface of the user terminal device 10 forward using a finger f12, thereby applying an external pressure to the user terminal device 10.

In response to the external pressure being applied, the user terminal device 10 may change from the unbent state to the pre-bending state as shown in view (b) of FIG. 12. As a result, the user terminal device 10 may control the flexible display 20 to display a screen including information 1201 on the music (for example, the singer name, lyrics, album of the reproduced music, etc.) on the first area 20-1 while the external pressure is maintained to keep the user terminal device 10 from returning back to the unbent state. In addition, the user terminal device 10 may control the flexible display 20 to display a screen including a UI element 1202 (for example, pause button, start button, repeat button, mode change button, etc.) for controlling the music application on the first area 20-1. The music may be paused or may be kept playing while the external pressure is being applied.

If the external pressure is removed, the user terminal device 10 may change from the pre-bending state back to the unbent state as shown in view (c) of FIG. 12. In response to the user terminal device 10 being unbent, the user terminal device 10 may control the flexible display 20 not to display the information on the music and/or the UI element any more on the first area 20-1 of the flexible display 20.

Figure 13A:
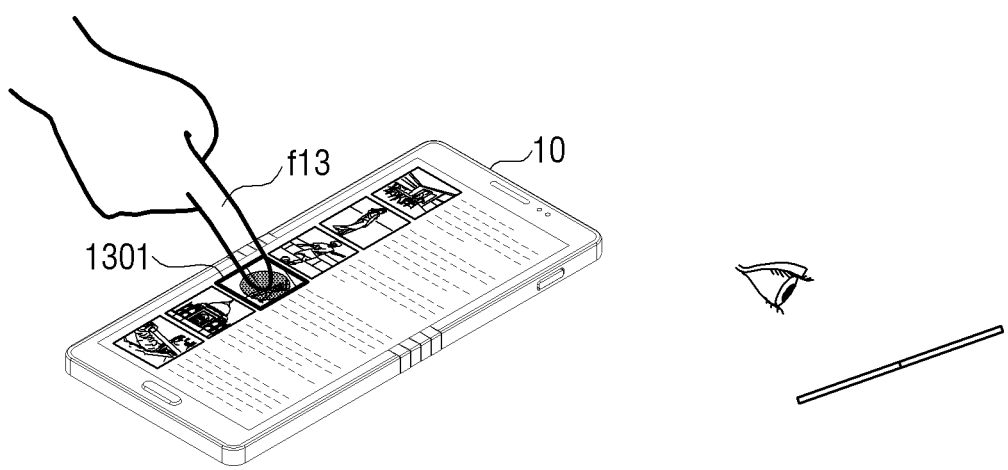
FIGS. 13A to 13B illustrate a screen displaying information on a flexible display as a bending state changes between an unbent state and a pre-bending state according to yet another exemplary embodiment.
Figure 13A:
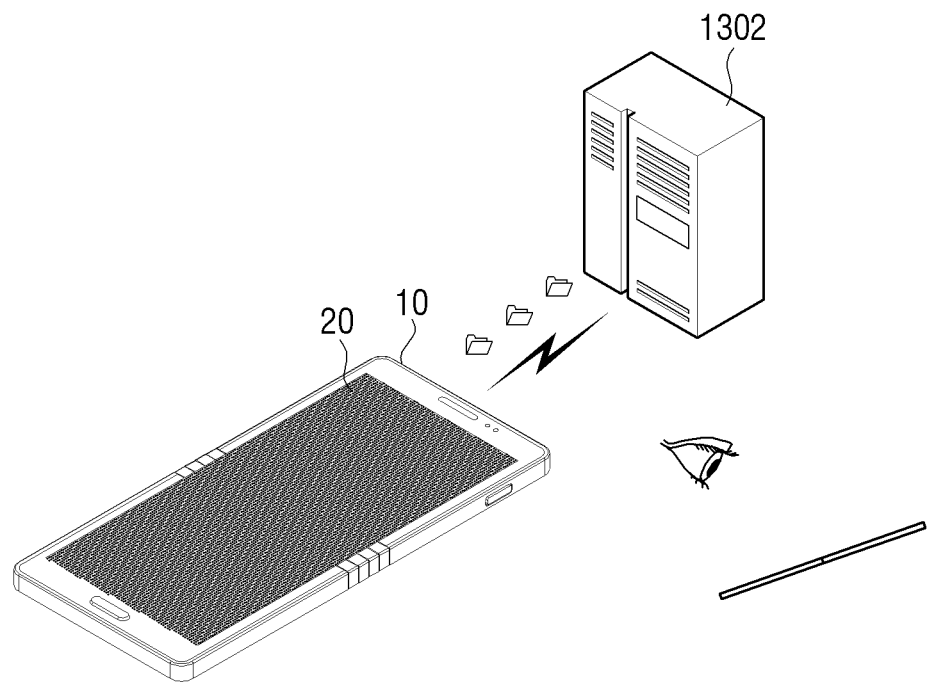

According to another exemplary embodiment, the user terminal device 10 may receive a user input by a user finger f13 to select a content 1301 or an application to download in the unbent state as shown in view (a) of FIG. 13A. The user terminal device 10 may continue downloading the content or the application from a server 1302 even while the flexible display 20 is in the inactivation state as shown in view (b) of FIG. 13A.

At this point, the user may push the upper portion of the rear surface of the user terminal device 10 forward using a finger f12, thereby applying an external pressure to the user terminal device 10.

Figure 13B:
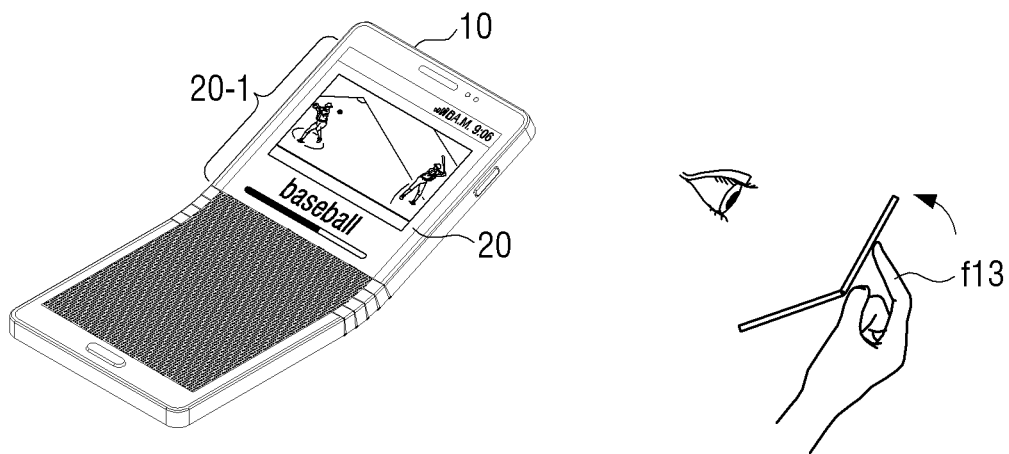
Figure 13B:
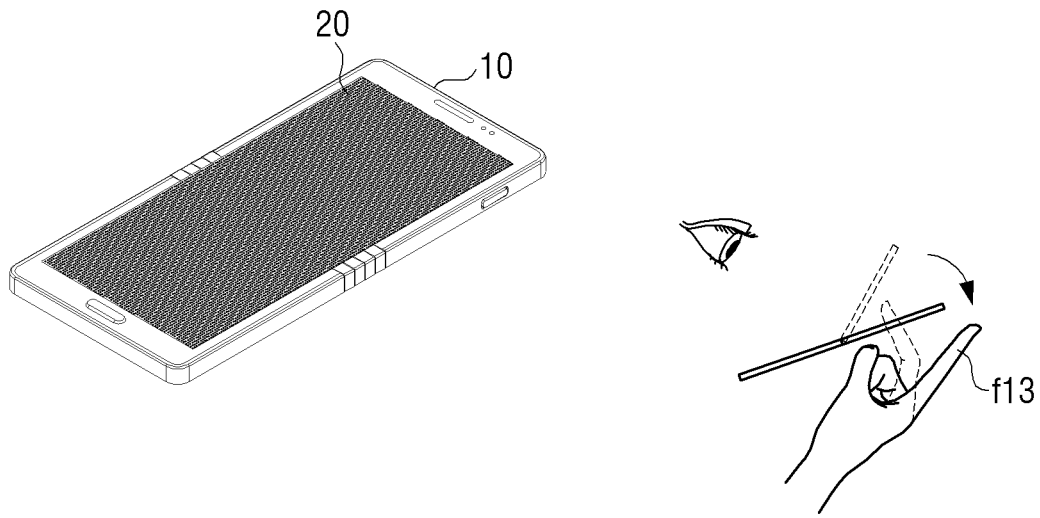

In response to the external pressure being applied, the user terminal device 10 may change from the unbent state to the pre-bending state as shown in view (c) of FIG. 13B. In this case, the user terminal device 10 may control the flexible display 20 to display information on the content or the application which is being downloaded, e.g., a download status bar, on the first area 20-1 while the external pressure is maintained to keep the user terminal device 10 from returning back to the unbent state.

If the external pressure is removed, the user terminal device 10 may return to the unbent state and control the flexible display 20 not to display the information on the content or the application any more on the first area 20-1 of the flexible display 20 as shown in view (d) of FIG. 13B. For example, the first area 20-1 of the flexible display 20 may enter an inactivation state, e.g., a sleep mode, or display different information.

Figure 14A:
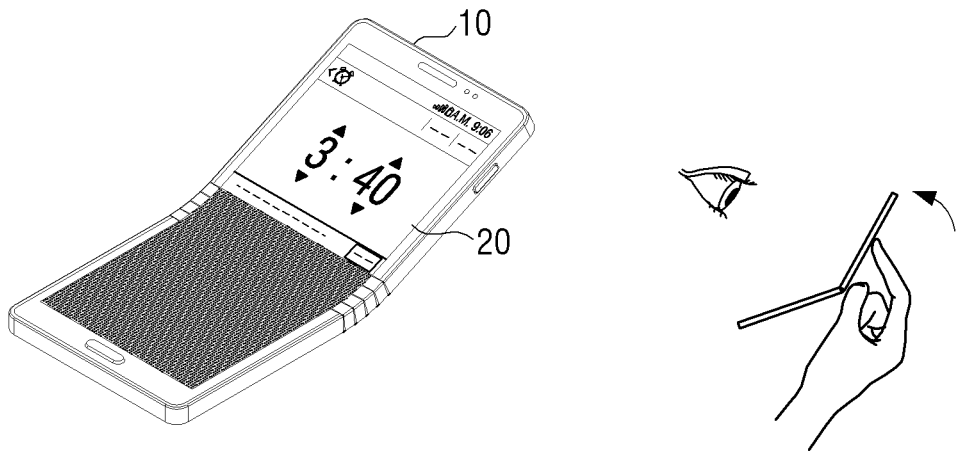
FIGS. 14A to 14C illustrate various quick viewing windows according to an exemplary embodiment.
Figure 14A:
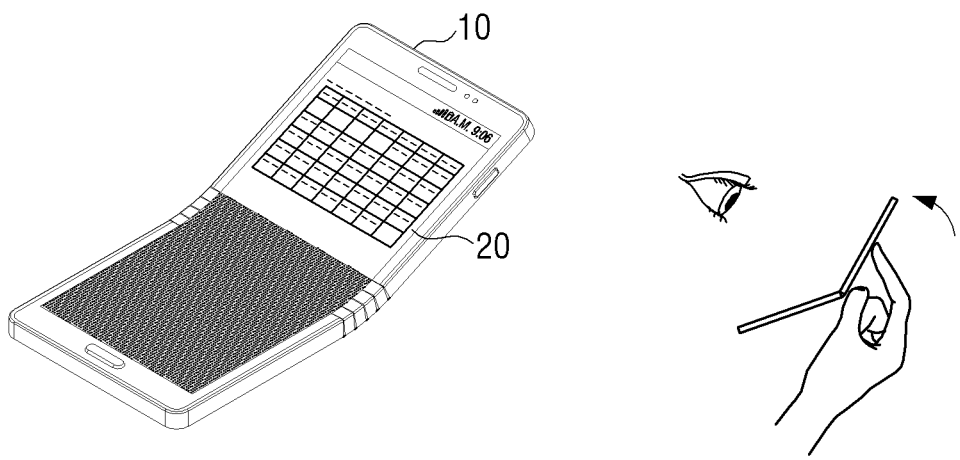
Figure 14B:
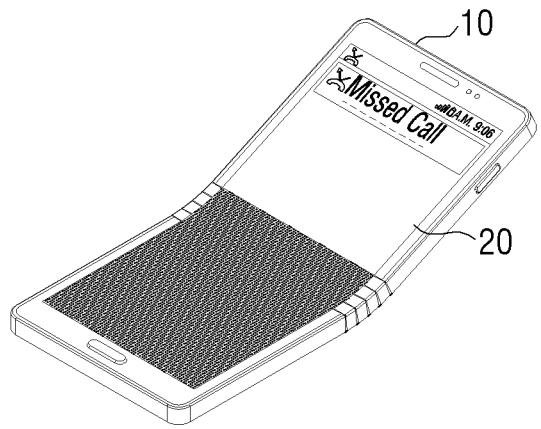
Figure 14B:
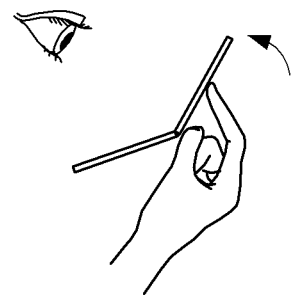
Figure 14B:
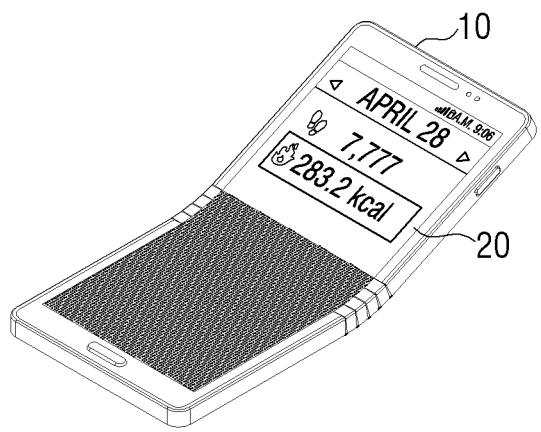
Figure 14B:
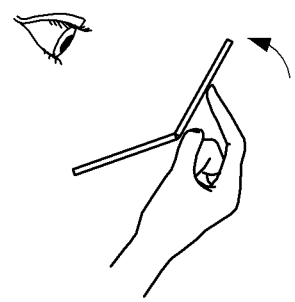
Figure 14C:
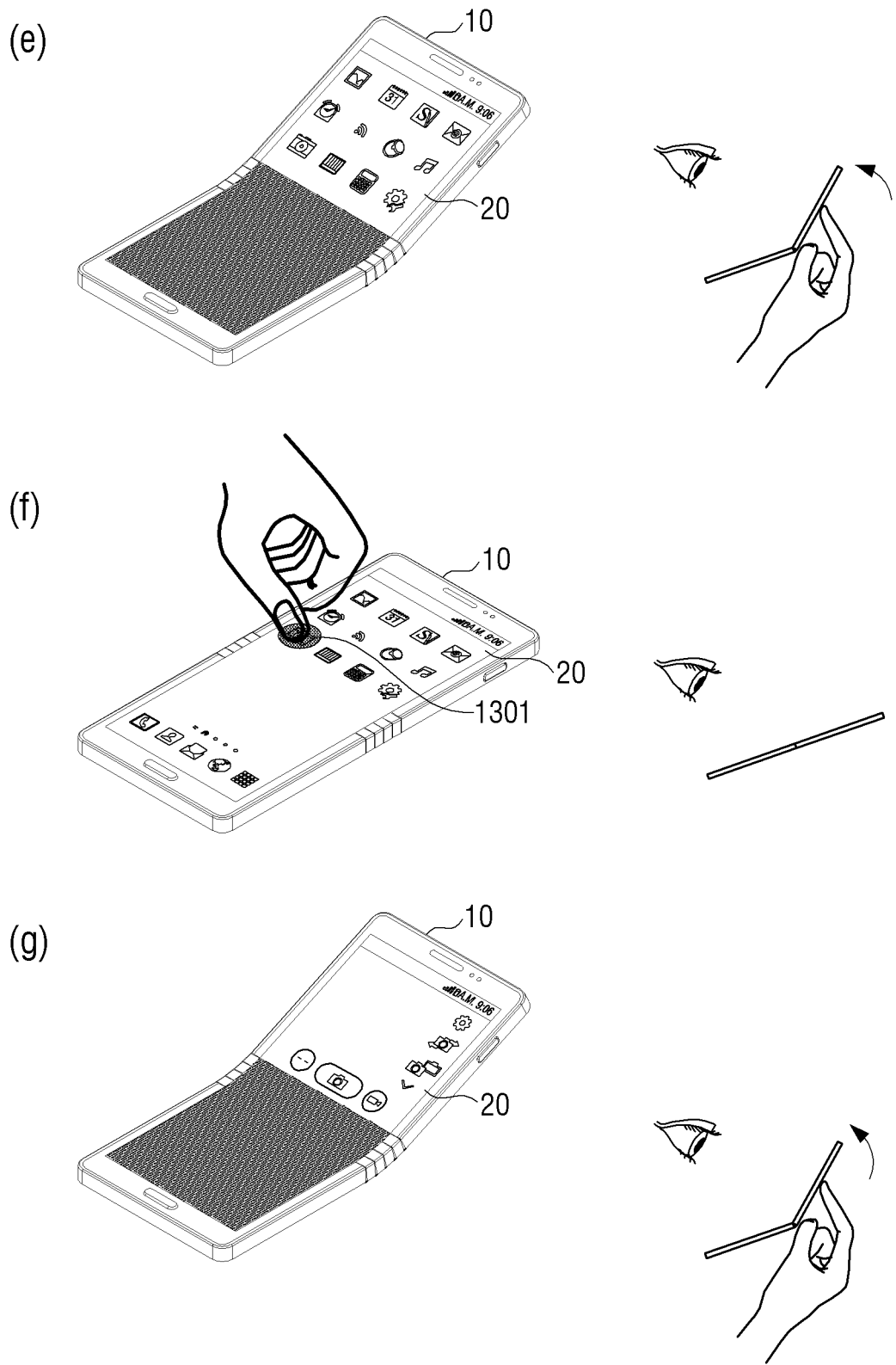

FIGS. 14A to 14C illustrate various quick viewing windows according to an exemplary embodiment.

The user terminal device 10 may change from an unbent state to a pre-bending state in response to external pressure being applied. In the pre-bending state, the user terminal device 10 may control the flexible display 20 to display various quick viewing windows.

For example, as shown in view (a) of FIG. 14A, the user terminal device 10 may control the flexible display 20 to display a clock alarm screen in the pre-bending state.

As shown in view (b) of FIG. 14A, the user terminal device 10 may control the flexible display 20 to display a calendar or schedule screen in the pre-bending state.

As shown in view (c) of FIG. 14B, the user terminal device 10 may control the flexible display 20 to display a screen displaying a missed call in the pre-bending state.

As shown in view (d) of FIG. 14B, the user terminal device 10 may control the flexible display 20 to display a health information display screen in the pre-bending state. Herein, the health information may be information such as the number of user's steps, a heart rate, a blood pressure, a blood glucose, recommended health information, sleep information, etc.

As shown in view (e) of FIG. 14C, the user terminal device 10 may control the flexible display 20 to display a home screen in the pre-bending state.

As shown in view (f) of FIG. 14C, the user terminal device 10 may control the flexible display 20 to display a home screen in the unbent state. In this case, in response to external pressure being applied after identification information 1301, e.g., an icon, of an application included in the home screen is selected, the user terminal device 10 may control the flexible display 20 to display an execution screen of the application (for example, a camera application) corresponding to the selected identification information as shown in view (g) of FIG. 14C.

As described above, the user can be provided with information through the quick viewing windows by a simple manipulation, i.e., bending, of the flexible display 20 in the inactivation state. That is, the user can be provided with information rapidly while gripping the user terminal device 10, without having to press a button mounted on the user terminal device 10 or unlock a locking screen.

Figure 15:
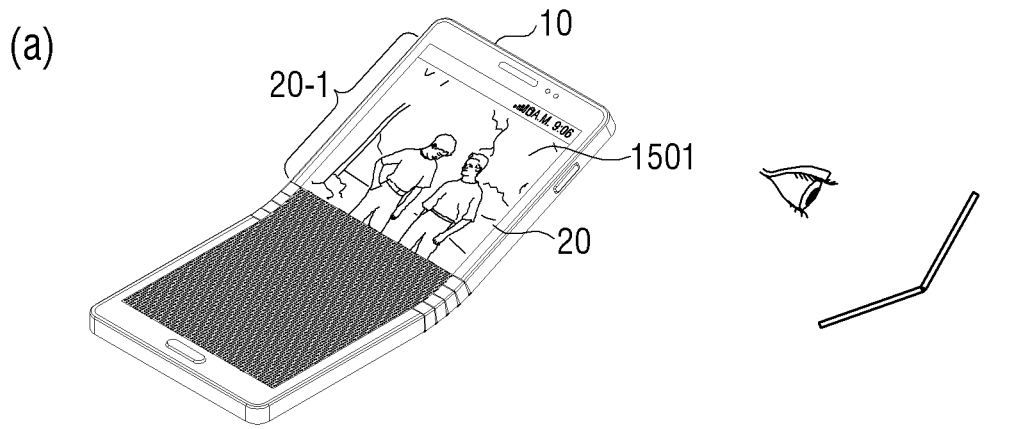
FIG. 15 illustrates a screen displaying information on a flexible display as an bending states changes between a step-bending state and a pre-bending state according to an exemplary embodiment.
Figure 15:
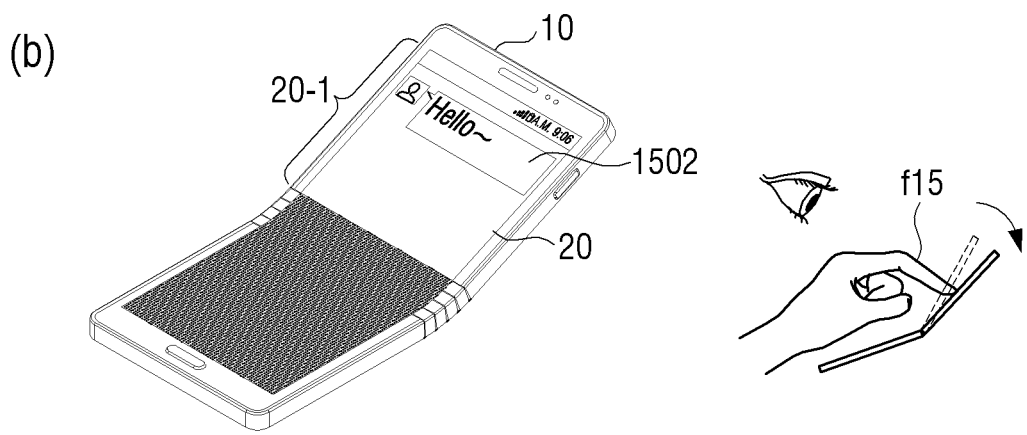
Figure 15:
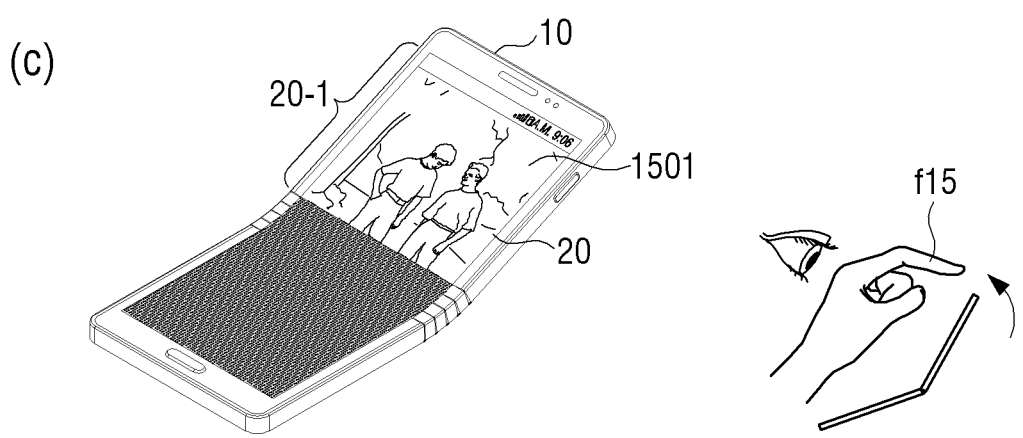
Figure 16:
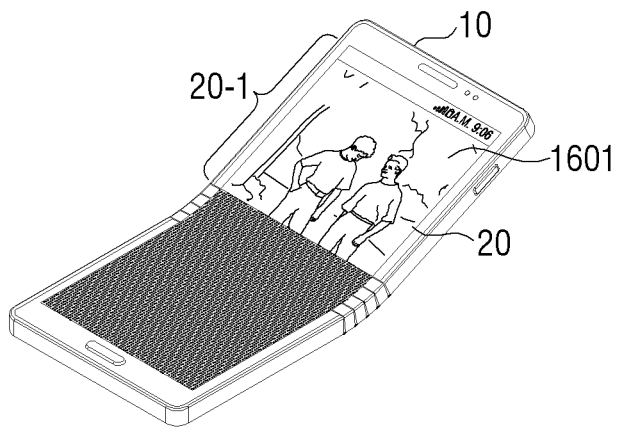
FIG. 16 illustrates a screen displaying information on a flexible display as an bending states changes between a step-bending state and a pre-bending state according to another exemplary embodiment.
Figure 16:
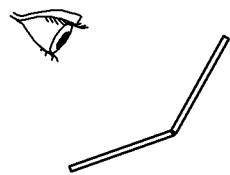
Figure 16:
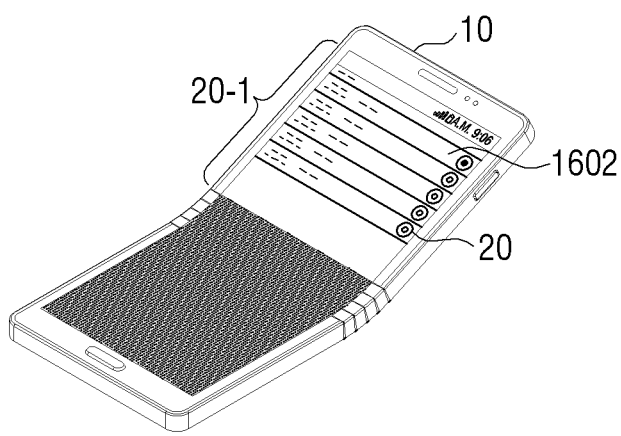
Figure 16:
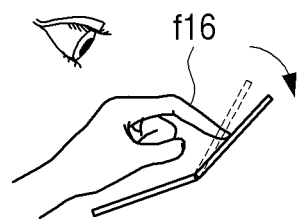
Figure 16:
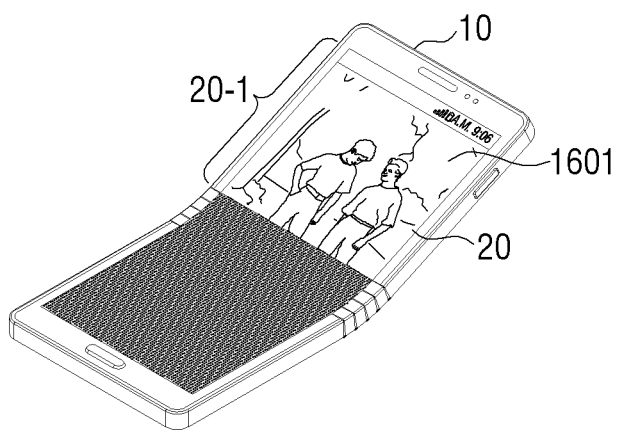
Figure 16:
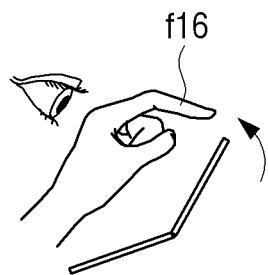

FIGS. 15 to 16 illustrate a screen of the flexible display 20 as a bending state changes from a step-bending state to a pre-bending state, according to an exemplary embodiment.

In view (a) of FIG. 15, the user terminal device 10 is in the step-bending state. As aforementioned, the step-bending state refers to a state in which the user terminal device 10 maintains its bent state even when there is no external pressure being applied. In the step-bending state, the user terminal device 10 may control the flexible display 20 to display an execution screen 1501 of a first application on the first area 20-1. For example, the execution screen 1501 of the first application may be an execution screen of a camera application, as shown in view (a) of FIG. 15. The execution screen of the camera application may include a preview screen showing a view before the view is photographed.

Next, while the user terminal device 10 is in the step-bending state, an external pressure may be applied to the user terminal device 10. For example, the external pressure may be a force pushing the upper portion of the front surface of the user terminal device 10 using a finger f15.

As a result, the user terminal device 10 may change from the step-bending state to the pre-bending state as shown in view (b) of FIG. 15. While the external pressure is being applied, the user terminal device 10 may control the flexible display 20 to display an execution screen of a second application 1502 on the first area 20-1 as a quick viewing window. For example, the execution screen of the second application 1502 may be an execution screen of a message application, as shown in view (b) of FIG. 15.

Next, while the user terminal device 10 is in the pre-bending state, the external pressure may be removed. For example, the user may stop pushing the upper portion of the front surface of the user terminal device 10 using the finger f15.

In response to the external pressure being removed, the user terminal device 10 may change from the pre-bending state back to its previous state, i.e., the step-bending state, as shown in view (c) of FIG. 15. In response to the bending state returning to the pre-bending state, the user terminal device 10 may control the flexible display 20 to display the execution screen of the first application 1501 on the first area 20-1 of the flexible display 20.

As described above, in response to a message being received while the camera application is running while the user terminal device 10 is in the bent state as shown in FIG. 15, the user may read the message through the quick viewing window by a simple manipulation. That is, the user can identify the message rapidly by simply changing the user terminal device 10 to the pre-bending state, without having to perform an operation for executing a message application.

Another exemplary embodiment will be explained with reference to FIG. 16. In view (a) of FIG. 16, the user terminal device 10 is in the step-bending state and the flexible display 20 displays an execution screen 1601 of a first application. For example, as shown in view (a) of FIG. 16, the execution screen 1601 of the first application may be an execution screen of a camera application.

Next, in the step-bending state of the user terminal device 10, external pressure may be applied to the user terminal device 10. For example, the external pressure may be a force pushing the upper portion of the front surface of the user terminal device 10 using a finger f16.

In this case, the user terminal device 10 may change from the step-bending state to the pre-bending state as shown in view (b) of FIG. 16. While the external pressure is being applied, the user terminal device 10 may control the flexible display 20 to display a screen 1602 including a UI element used in the first application. Also, the UI element may be used for controlling the sensor unit 180 through the first application. For example, the UI element may include buttons for configuring a photographing control mode (for example, an aperture priority mode, a shutter priority mode, a focus auto/manual mode, a sensitivity adjustment priority mode, etc.), and buttons for configuring a photographing type (for example, a panorama photographing mode, a moving image photographing mode, a still image photographing mode, etc.).

In response to the external pressure being removed, the user terminal device 10 may change from the pre-bending state back to the step-bending state as shown in view (c) of FIG. 16. As a result, the user terminal device 10 may control the flexible display 20 to display the execution screen 1601 of the first application on the first area 20-1 of the flexible display 20.

Figure 17A:
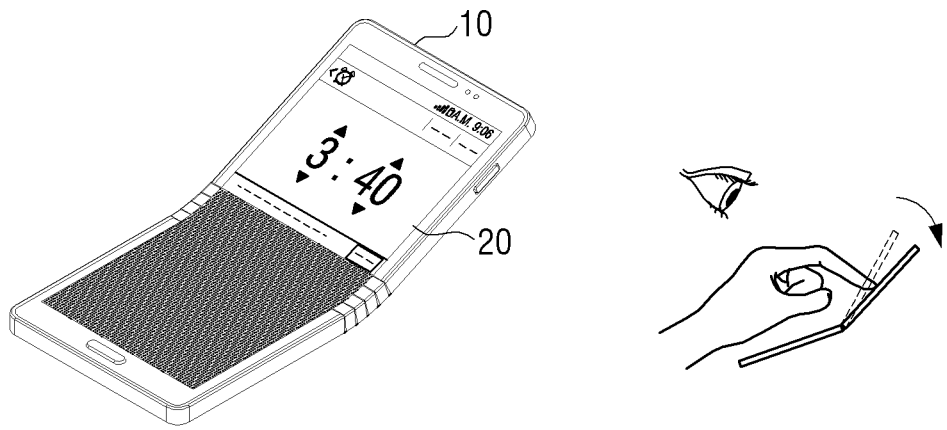
FIGS. 17A and 17B illustrate various quick viewing windows according to an exemplary embodiment.
Figure 17A:
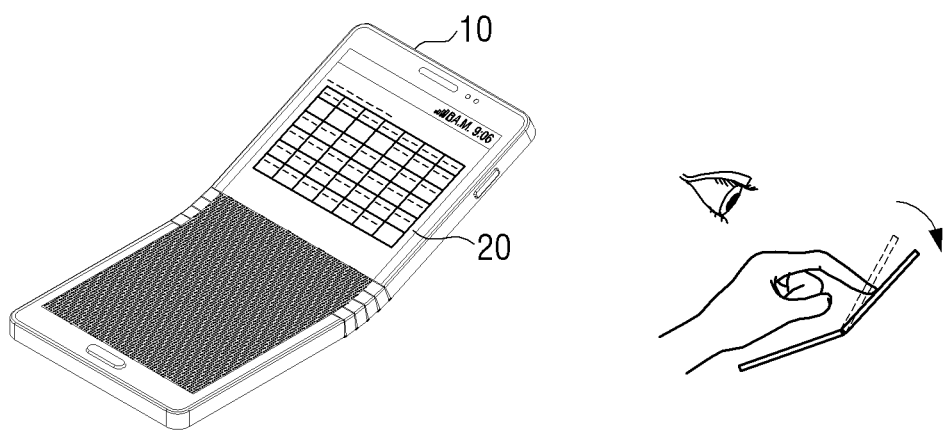
Figure 17B:
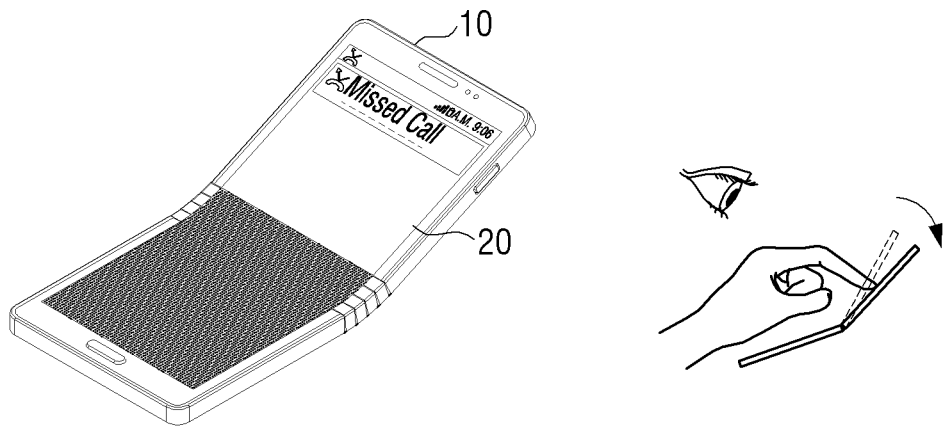
Figure 17B:
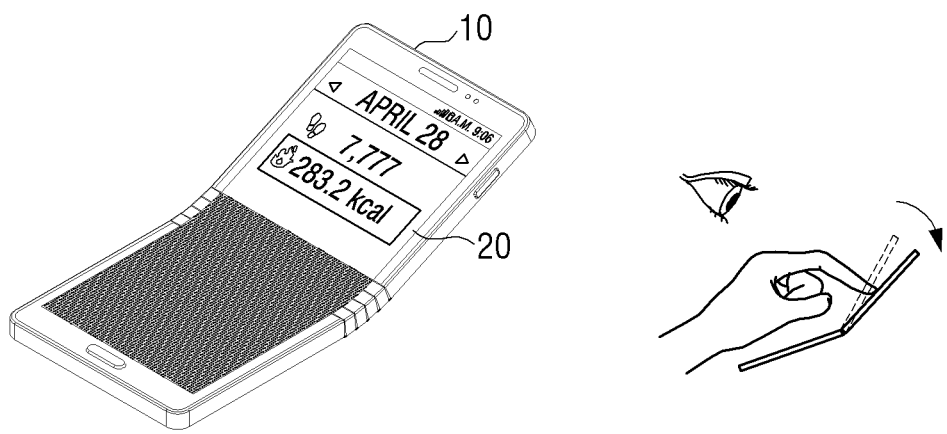

FIGS. 17A and 17B illustrate various quick viewing windows according to an exemplary embodiment.

In response to an external pressure being applied, the user terminal device 10 may change from the step-bending state to the pre-bending state. In the pre-bending state, the user terminal device 10 may control the flexible display 20 to display various quick viewing windows. For example, as shown in view (a) of FIG. 17A, the user terminal device 10 may control the flexible display 20 to display a clock alarm screen in the pre-bending state.

Also, as shown in view (b) of FIG. 17A, the user terminal device 10 may control the flexible display 20 to display a calendar or schedule screen in the pre-bending state.

Also, as shown in view (c) of FIG. 17B, the user terminal device 10 may control the flexible display 20 to display a screen displaying a missed call in the pre-bending state.

Also, as shown in view (d) of FIG. 17B, the user terminal device 10 may control the flexible display 20 to display a health information display screen in the pre-bending state. Herein, the health information may be information such as the number of user's steps, a heart rate, a blood pressure, a blood glucose, recommended health information, sleep information, etc.

FIGS. 18A to 21B illustrate a screen of the flexible display 20 as a bending state changes in an order of an unbent state, a pre-bending state, and a step-bending state, according to an exemplary embodiment.

Figure 18A:
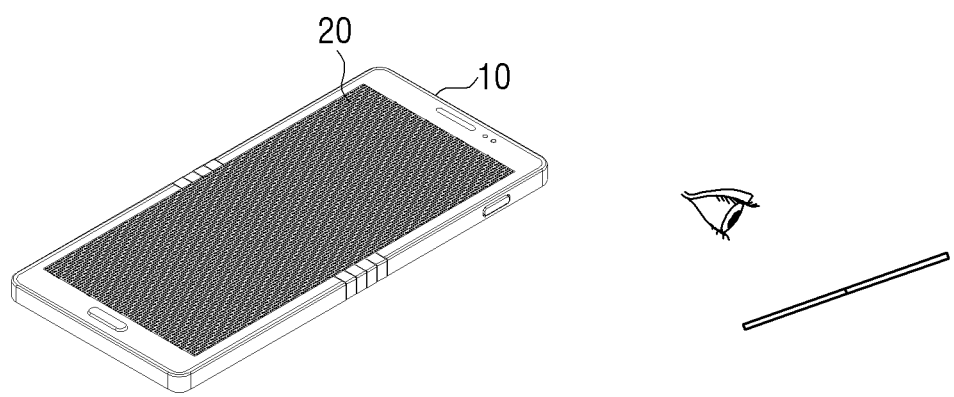
FIGS. 18A to 18B illustrate a screen of a flexible display as a bending state changes in an order of an unbent state, a pre-bending state, and a step-bending state, according to an exemplary embodiments.
Figure 18A:
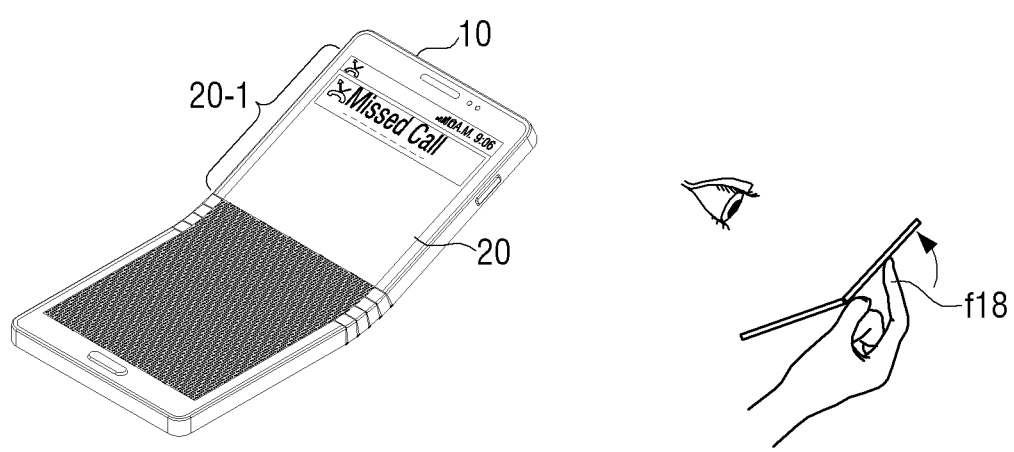

In view (a) of FIG. 18A, the user terminal device 10 is in the unbent state and the flexible display 20 is in an inactivation state.

If an external pressure is applied, the user terminal device 10 may change from the unbent state to the pre-bending state as shown in view (b) of FIG. 18A. In this case, the user terminal device 10 may control the flexible display 20 to display first information on the first area 20-1 while the external pressure is being applied. For example, as shown in view (b) of FIG. 18A, the first information may be information on a missed call.

Next, more external pressure may be applied to the user terminal device 10 in the pre-bending state. In this case, the external pressure may be a force continuously pushing the upper portion of the rear surface of the user terminal device 10 forward using a finger f18 until the user terminal device 10 is bent by more than a predetermined angle or predetermined curvature.

Figure 18B:
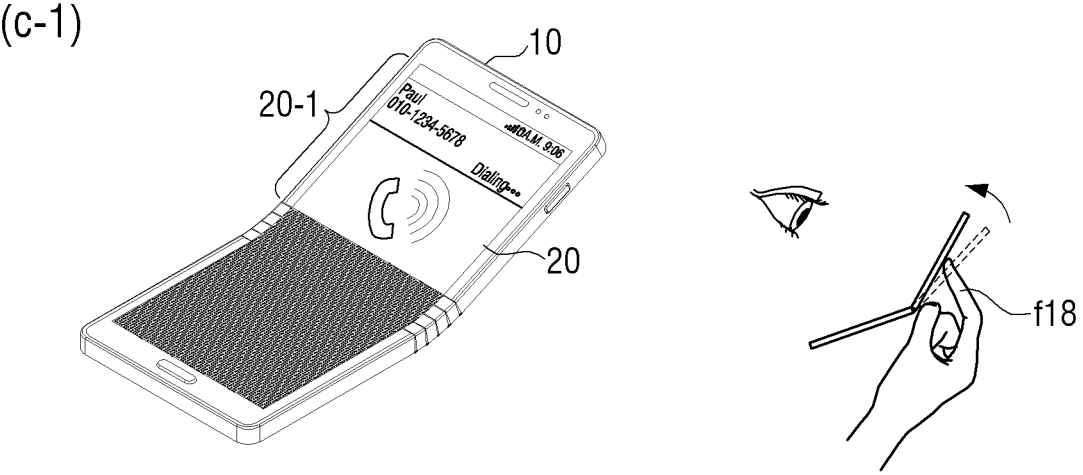
Figure 18B:
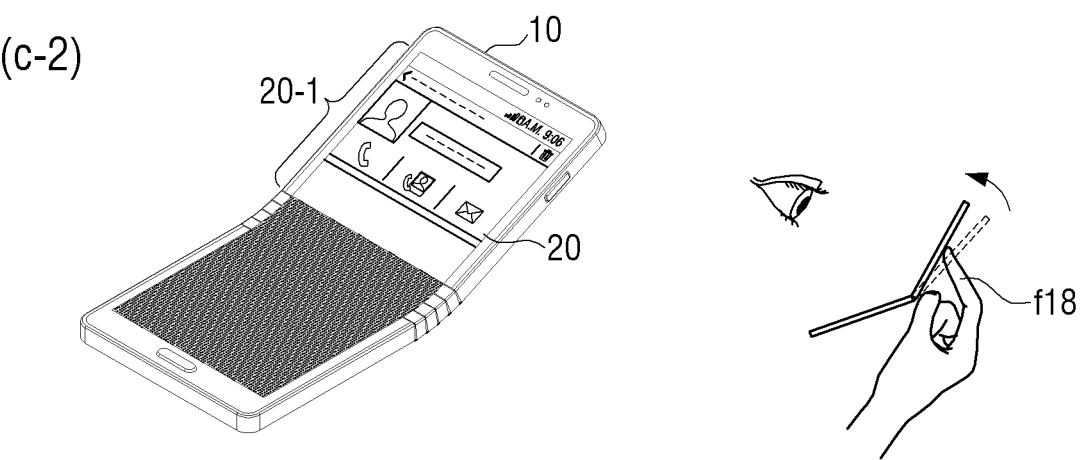

In response to the more external pressure, the user terminal device 10 may change from the pre-bending state to the step-bending state as shown in FIG. 18B. As aforementioned, the step-bending state refers to a state in which the user terminal device 10 maintains its bent state even when the external pressure is removed. In the step-bending state, the user terminal device 10 may control the flexible display 20 to display second information related to the first information on the first area 20-1. For example, the second information may be information indicating dialing the number of the missed call as shown in view (c-1) of FIG. 18B. Alternatively, as shown in view (c-2) of FIG. 18B, the second information may be UI elements for dialing the number of the missed call or transmitting a message.

Figure 19A:
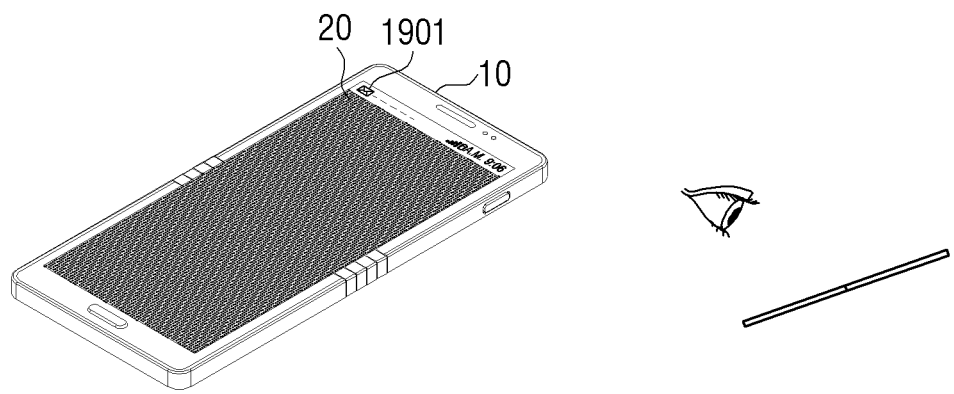
FIGS. 19A to 19B illustrate a screen of a flexible display as a bending state changes in an order of an unbent state, a pre-bending state, and a step-bending state, according to another exemplary embodiments.
Figure 19A:
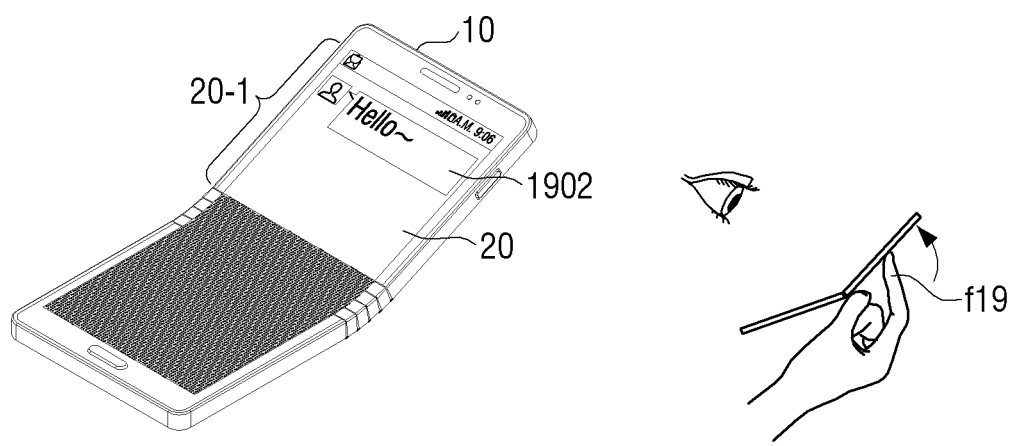

In view (a) of FIG. 19A, the user terminal device 10 is in the unbent state. In response to the user terminal device 10 receiving a message in the unbent state, the user terminal device 10 may control the flexible display 20 to display notification information 1901 indicating receipt of the message on a specific area of the flexible display 20 (for example, on an upper tray). The notification information 1901 may include at least one of a message icon and a part of a content of the message content.

At this point, if an external pressure is applied and thus the user terminal device 10 changes from the unbent state to the pre-bending state as shown in view (b) of FIG. 19A, the user terminal device 10 may control the flexible display 20 to display a message content 1902 on the first area 20-1.

Figure 19B:
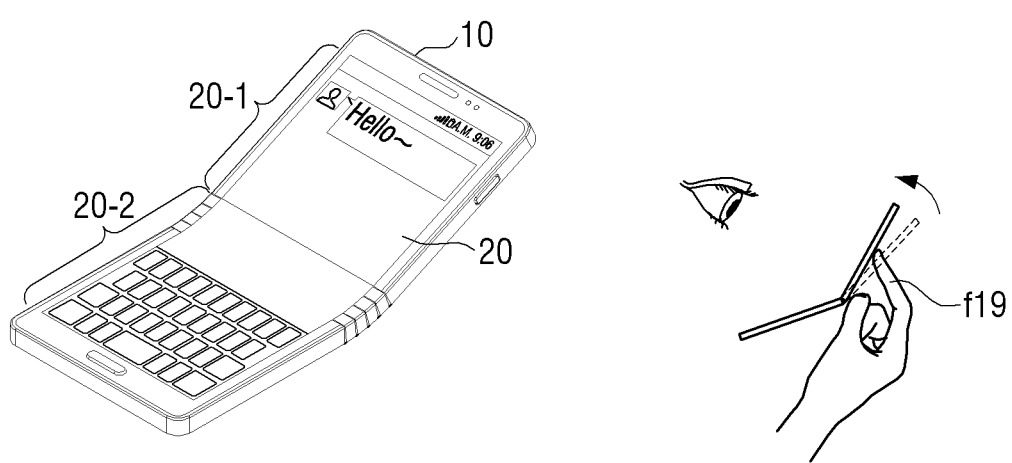
Figure 19B:
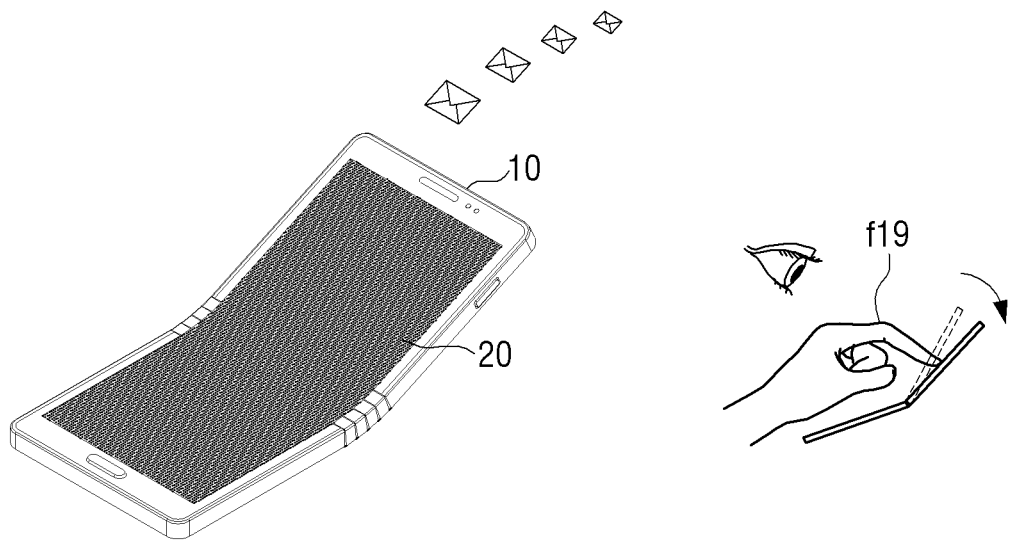

If a bending state further changes from the pre-bending state to the step-bending state due to an external pressure, the user terminal device 10 may control the flexible display 20 to display a message input screen on the first area 20-1 and display a keypad for inputting a message on the second area 20-2 as shown in view (c) of FIG. 19B.

Next, in the step-bending state, an external pressure may be applied to the user terminal device 10 in the opposite direction to the previously applied external pressure. For example, this external pressure may be a force pushing the upper portion of the front surface of the user terminal device 10 using a finger f19 to bend the user terminal device 10 by less than a predetermined angle or predetermined curvature.

In response to the external pressure being applied in the opposite direction, the user terminal device 10 may change back to the pre-bending state (or the unbent state) as shown in view (d) of FIG. 19B. As a result, the user terminal device 10 may send a message composed using the message input screen in the step-bending state through the communicator 140. In other words, at least one command used in the application may be inputted by changing a bending state while an execution screen of the application is displayed.

Figure 20A:
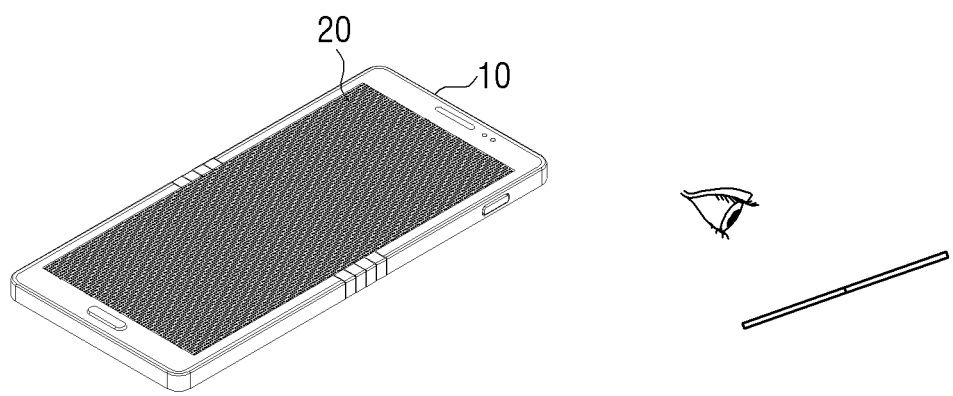
FIGS. 20A to 20B illustrate a screen of a flexible display as a bending state changes in an order of an unbent state, a pre-bending state, and a step-bending state, according to yet another exemplary embodiments.
Figure 20A:
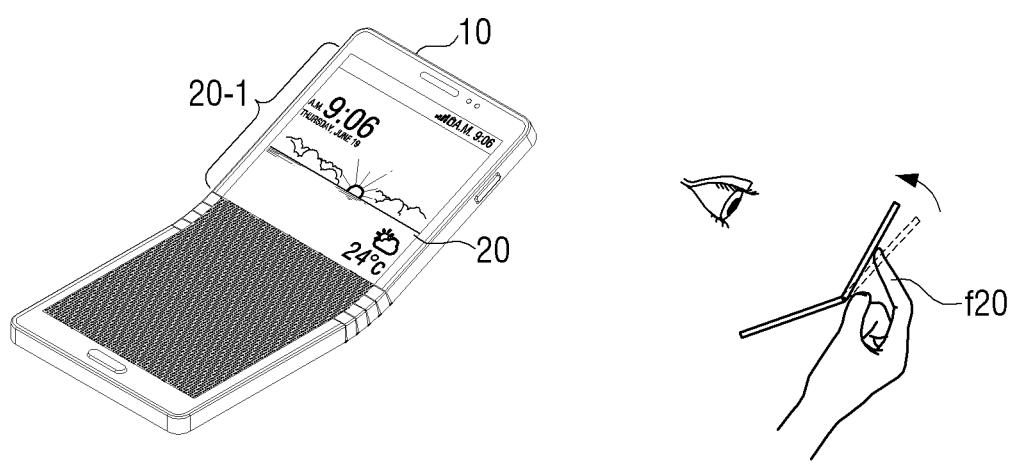

In view (a) of FIG. 20A, the user terminal device 10 is in the unbent state. In the unbent state, the flexible display 20 of the user terminal device 10 may be in an inactivation state.

If an external pressure is applied, the user terminal device 10 may change from the unbent state to the pre-bending state as shown in view (b) of FIG. 20A. In this case, the user terminal device 10 may control the flexible display 20 to display a widget screen including time information and/or weather information on the first area 20-1 while the external pressure is being applied.

Figure 20B:
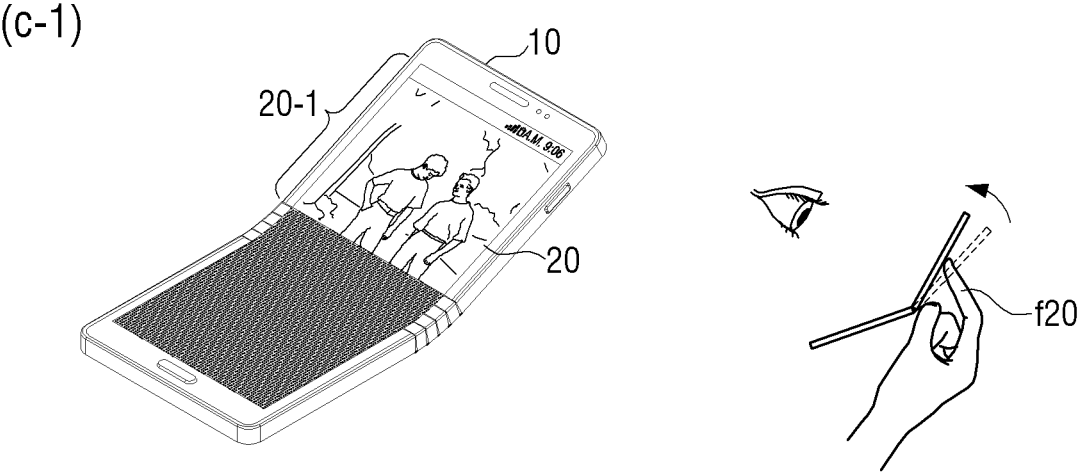
Figure 20B:
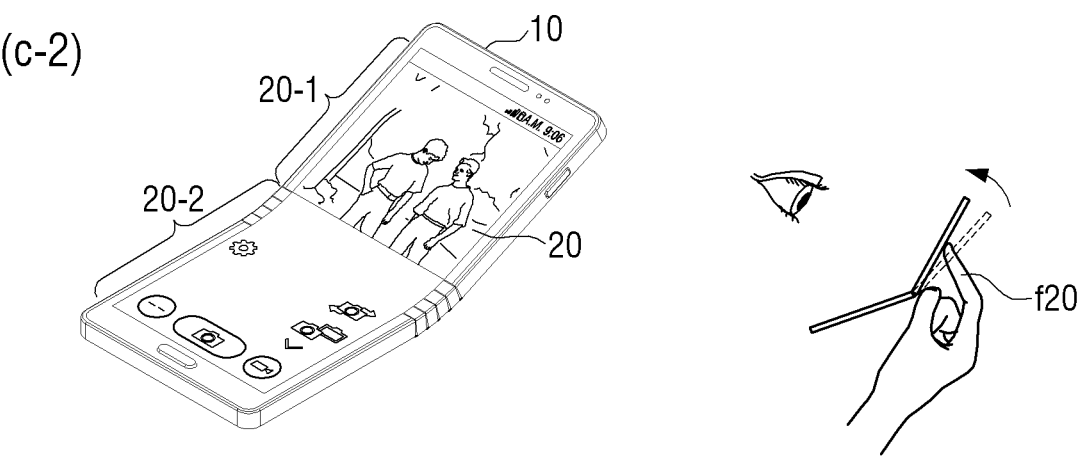

If the external pressure continues such that the user terminal device 10 changes from the pre-bending state to the step-bending state, the user terminal device 10 may control the flexible display 20 to display an execution screen of a camera application (for example, a preview screen) on the first area 20-1 as shown in view (c-1) of FIG. 20B. In addition, the user terminal device 10 may control the flexible display 20 to further display a screen including UI elements for manipulating the camera application on the second area 20-2, as shown in view (c-2) of FIG. 20B.

Figure 21A:
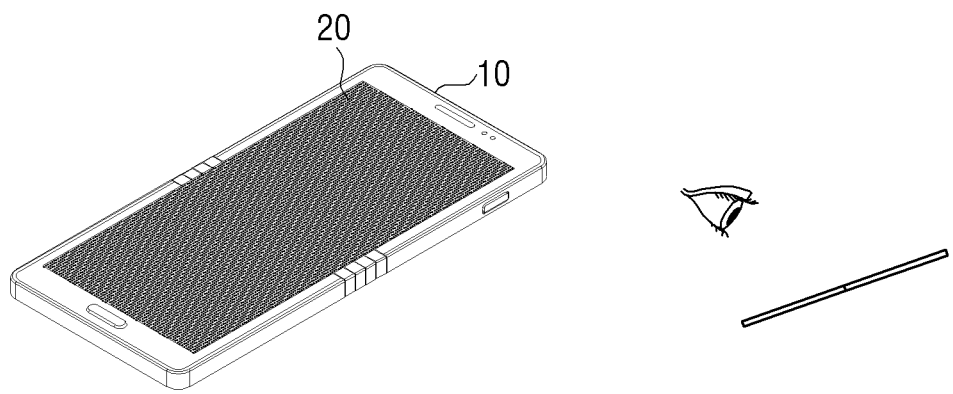
FIGS. 21A to 21B illustrate a screen of a flexible display as a bending state changes in an order of an unbent state, a pre-bending state, and a step-bending state, according to yet another exemplary embodiment.
Figure 21A:
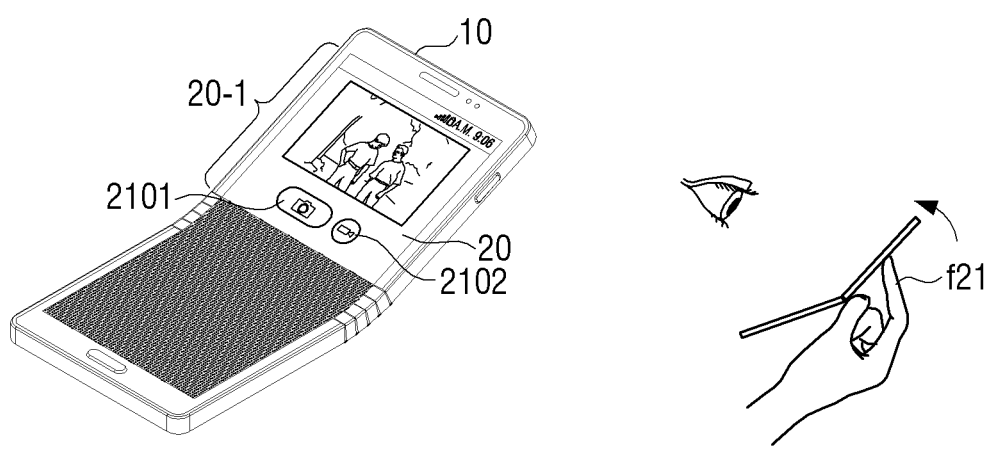

In view (a) of FIG. 21A, the flexible display 20 of the user terminal device 10 in the unbent state may be in an inactivation state.

If an external pressure is applied such that the user terminal device 10 changes from the unbent state to the pre-bending state, the user terminal device 10 may control the flexible display 20 to display a screen including a UI element 2101 for selecting a still image photographing mode and a UI element 2102 for selecting a moving image photographing mode on the first area 20-1 while the external pressure is being applied.

Figure 21B:
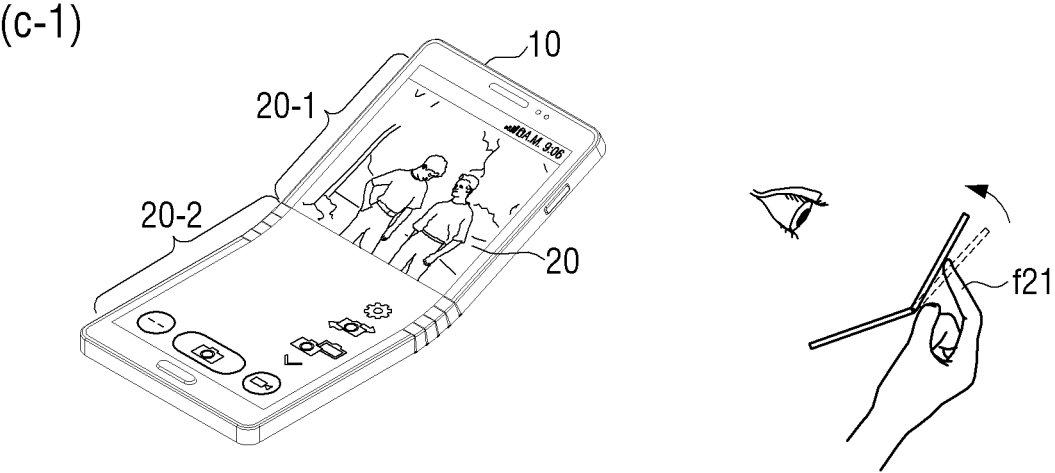
Figure 21B:
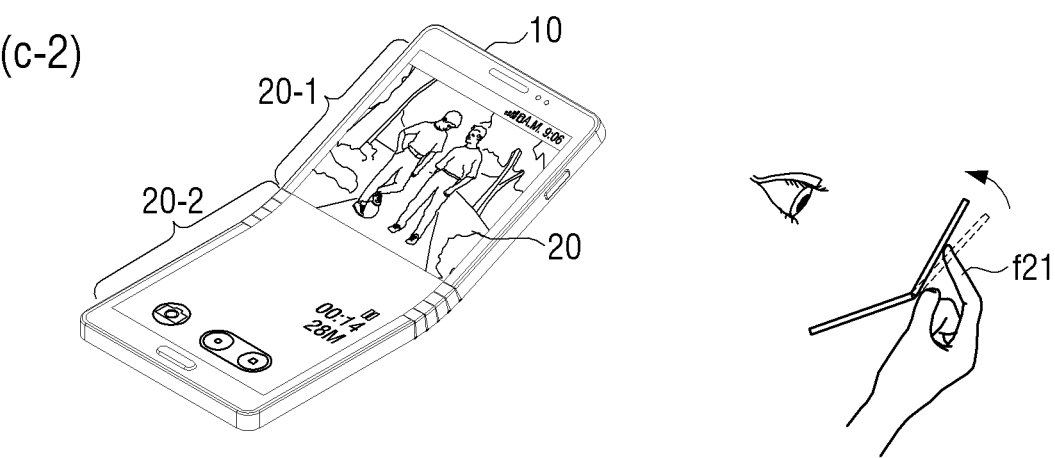

If the external pressure continues such that the user terminal device 10 changes from the pre-bending state to the step-bending state, the UI element 2101 for photographing a still image is selected as shown in view (c-1) of FIG. 21B. As a result, the user terminal device 10 may control the flexible display 20 to display an execution screen of a camera application (for example, a preview screen) for photographing a still image on the first area 20-1. In addition, the user terminal device 10 may control the flexible display 20 to display a screen including UI elements used for photographing a still image on the second area 20-2.

Alternatively, the UI element 2102 for photographing a moving image may be selected if the user terminal device 10 changes from the pre-bending state to the step-bending state. As a result, the user terminal device 10 may control the flexible display 20 to display an execution screen of a camera application (for example, a preview screen) for photographing a moving image on the first area 20-1. In addition, the user terminal device 10 may control the flexible display 20 to display a screen including UI elements used for photographing of a moving image on the second area 20-2.

In view (b) of FIG. 21A, the user terminal device 10 may control the flexible display 20 to display a screen including guide information for photographing a still image and a moving image on the first area 20-1. For example, the guide information may indicate that the user terminal device 10 will enter a still image photographing mode when an additional external pressure is applied to the user terminal device 10 within a predetermined time, and that the user terminal device 10 will enter a moving image photographing mode if an external pressure is additionally applied after a predetermined time elapses.

Accordingly, if an additional external pressure is applied within the predetermined time, the user terminal device 10 may control the flexible display 20 to display a screen for photographing a still image as shown in view (c-1) of FIG. 21B. The bending state may be changed from the pre-bending state to the step-bending state in response to the additional external pressure.

On the other hand, if an external pressure is applied after the predetermined time elapses, the user terminal device 10 may control the flexible display 20 to display a screen for photographing a moving image as shown in view (c-2) of FIG. 21B.

Figure 22A:
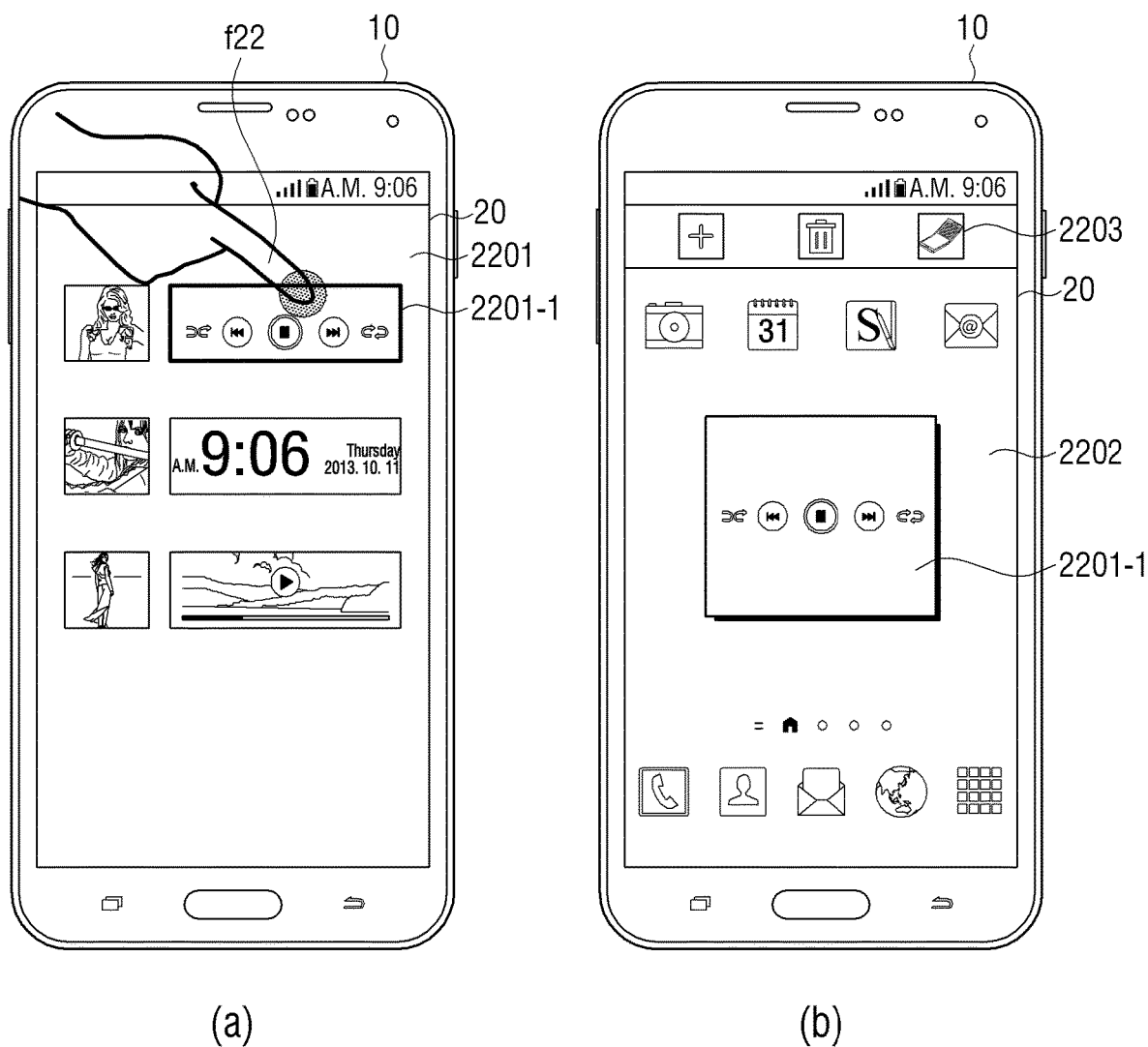
FIGS. 22A to 22B illustrate a method for configuring a quick viewing window according to an exemplary embodiment.
Figure 22B:
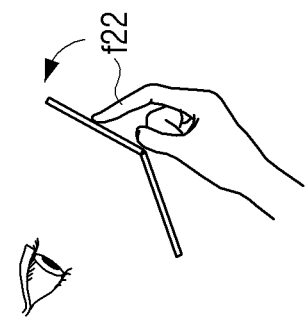
Figure 22B:
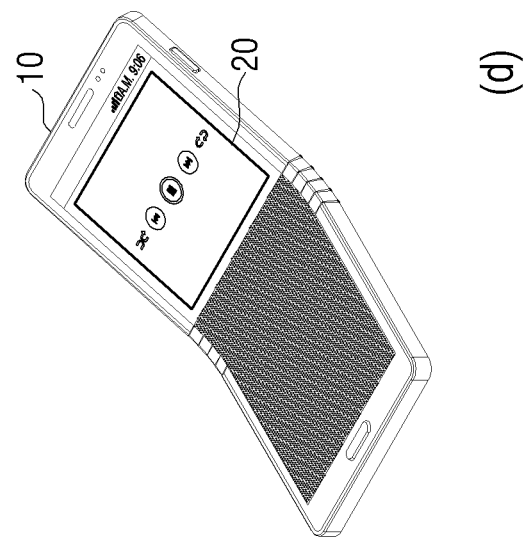
Figure 22B:
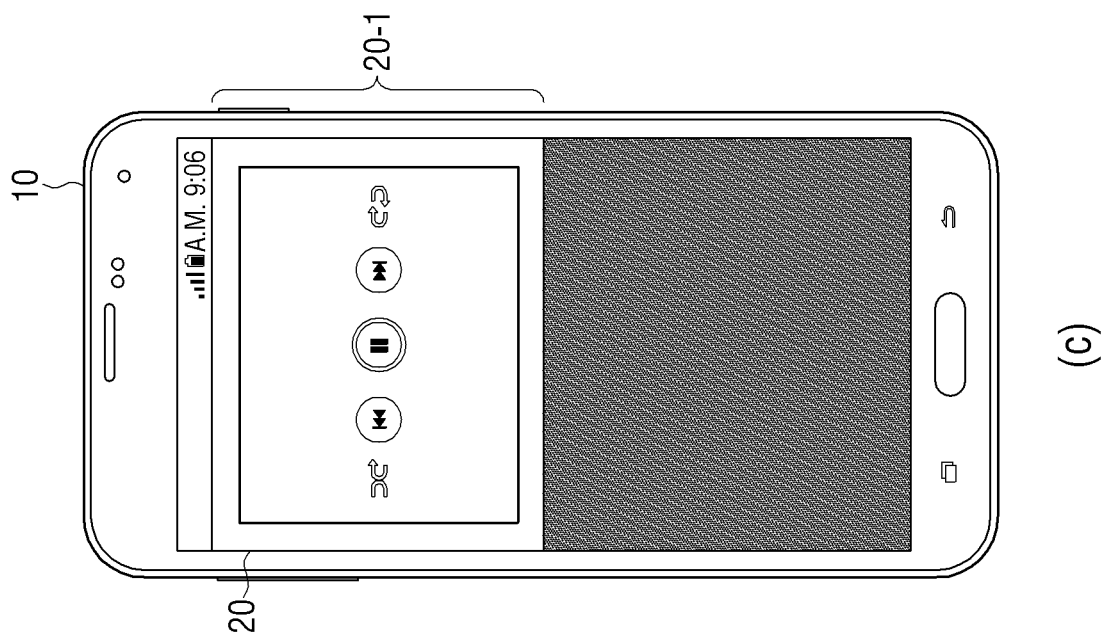

FIGS. 22A to 22B illustrate a method for configuring a quick viewing window according to an exemplary embodiment.

As shown in FIG. 22A, the user may determine an application, a widget, a content, etc. to be displayed on a quick viewing window in response to the user terminal device 10 being bent or unbent.

Referring to view (a) of FIG. 22A, the user terminal device 10 may control the flexible display 20 to display a screen 2201 for selecting a widget, a content, etc. Next, the sensor unit 180 of the user terminal device 100 may detect a user input by a finger f22 to select a widget 2201-1.

In response to detecting the user input, the user terminal device 100 may control the flexible display 20 to display which enables the user to select a screen on which the selected widget 2201-1 will be displayed as shown in view (b) of FIG. 22A. In this case, the screen on which the widget will be displayed may be a home screen 2102 or a quick viewing window. For example, if the sensor unit 180 of the user terminal device 100 may detect a user input to move the selected widget 2201-1 onto an icon 2203 representing the quick viewing window, the selected widget 2201-1 is displayed on the quick viewing window.

In response to the user input moving the selected widget 2201-1 onto an icon 2203, the user terminal device 10 may control the flexible display 20 to display a quick viewing window on the first area 20-1 of the flexible display 20 to indicate that the selected widget 2201-1 is determined to be displayed on the quick viewing window, as shown in view (c) of FIG. 22B.

Thereafter, if the user terminal device 10 changes from the unbent state to the pre-bending state in response to an external pressure (for example, by a finger f22), the user terminal device 10 may control the flexible display 20 to display the determined widget on the quick viewing window as shown in view (d) of FIG. 22B. In addition, if the user terminal device 10 returns to the unbent state in response to an external pressure, the user terminal device 10 may control the flexible display 20 to display the determined widget on the quick viewing window.

Figure 23:
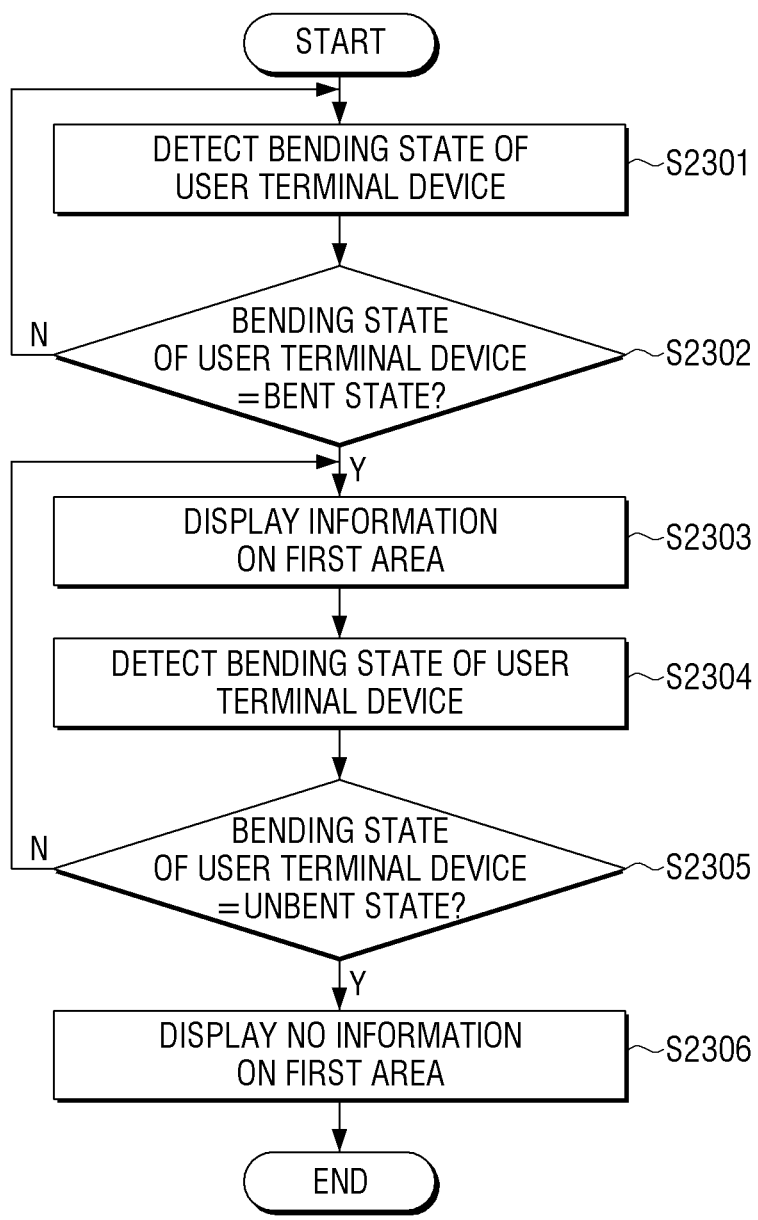
FIG. 23 is a flowchart illustrating a method for a user terminal device to display information, according to an exemplary embodiment.

FIG. 23 is a flowchart illustrating a method for the user terminal device 10 to display information, according to an exemplary embodiment.

In S2301, the user terminal device 10 may detect the bending state of the user terminal device 10.

In 2302, the user terminal device 10 may determine whether the user terminal device 10 is in a bent state (for example, the pre-bending state or the step-bending state) based on the detected bending state.

If the user terminal device 10 is in the bent state (S2302-Y), the user terminal device 10 may display information on the first area 20-1 of the flexible display 20 in S2303. The first area 20-1 may be a display area of the flexible display 20 which is formed on the upper portion of one axis with reference to which the user terminal device 10 is bent.

In S2304, the user terminal device 10 may detect the bending state of the user terminal device 10.

In S2305, the user terminal device 10 may determine whether the user terminal device 10 is in an unbent state based on the bending state detected in S2304.

If the user terminal device 10 is determined to be in the unbent state (S2305-Y), the user terminal device 10 may not display the information any more on the first area 20-1 of the flexible display 20 in S2306. In other words, the user terminal device 10 removes the information displayed on the first area 20-1. For example, the user terminal device 10 may inactivate the flexible display 20, so no information may be displayed on the first area 20-1. Alternatively, the user terminal device 10 may display different information, e.g., a home screen on the first area 20-1 and/or the second area 20-2 in S2306.

Figure 24:
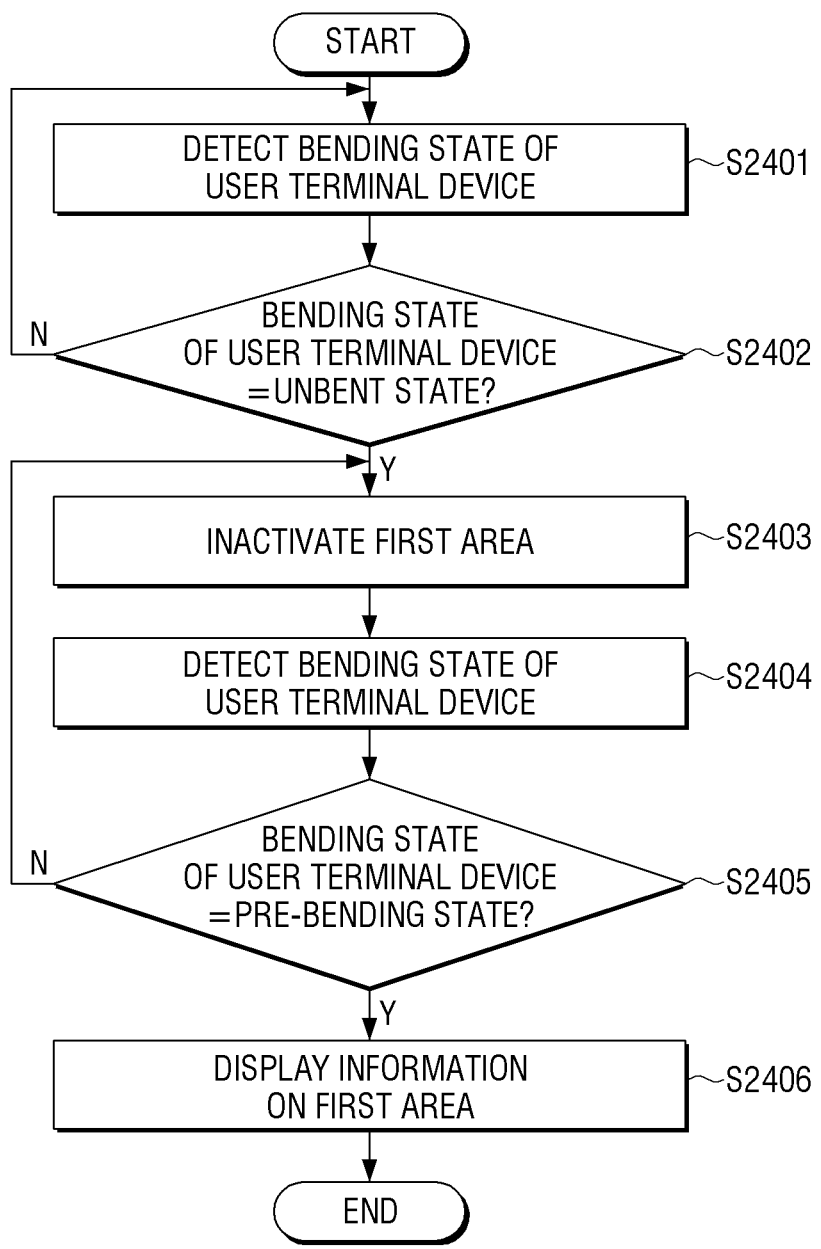
FIG. 24 is a flowchart illustrating a method for a user terminal device to display information, according to another exemplary embodiment.

FIG. 24 is a flowchart illustrating a method for the user terminal device 10 to display a content, according to another exemplary embodiment.

In S2401, the user terminal device 10 may detect the bending state of the user terminal device 10.

In 2402, the user terminal device 10 may determine whether the user terminal device 10 is in the unbent state based on the detected bending state.

If the user terminal device 10 is determined to be in the unbent state (S2402-Y), the user terminal device 10 may inactivate the first area of the flexible display 20 in S2403.

In S2404, the user terminal device 10 may detect the bending state of the user terminal device 10.

In S2405, the user terminal device 10 may determine whether the user terminal device 10 is in a pre-bending state based on the bending state detected in S2404. If the user terminal device 10 is determined to be in the pre-bending state (S2405-Y), the user terminal device 10 may display information on the first area 20-1 of the flexible display 20 in S2406.

Figure 25:
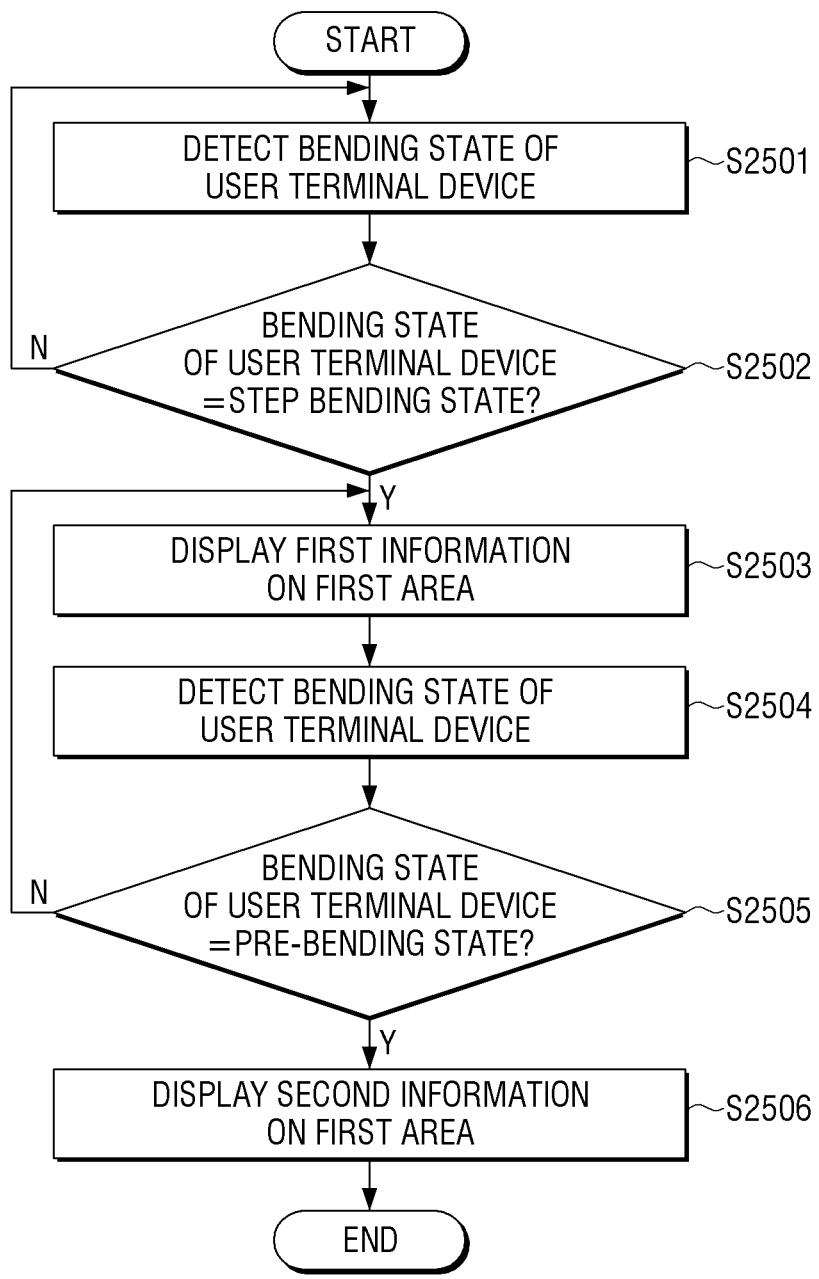
FIG. 25 is a flowchart illustrating a method for a user terminal device to display information, according to yet another exemplary embodiment.

FIG. 25 is a flowchart illustrating a method for the user terminal device 10 to display a content, according to another exemplary embodiment.

In S2501, the user terminal device 10 may detect the bending state of the user terminal device 10.

In 2502, the user terminal device 10 may determine whether the user terminal device 10 is in a step-bending state based on the detected bending state.

If the user terminal device 10 is determined to be in the step-bending state (S2502-Y), the user terminal device 10 may display first information on the first area 20-1 of the flexible display 20 in S2503. The first information may include, but is not limited to, a content, notification information (for example, a message, information on a missed call, weather information, time information, alarm information, etc.), or a UI element as described above. Also, the first information may be an execution screen of a first application.

In S2504, the user terminal device 10 may detect the bending state of the user terminal device 10.

In S2505, the user terminal device 10 may determine whether the user terminal device 10 is in the pre-bending state based on the bending state detected in S2504. If the user terminal device 10 is determined to be in the pre-bending state (S2505-Y), the user terminal device 10 may display second information on the first area 20-1 of the flexible display 20 in S2506. The second information may be information different from the first information. For example, the second information may be an execution screen of a second application.

Figure 26:
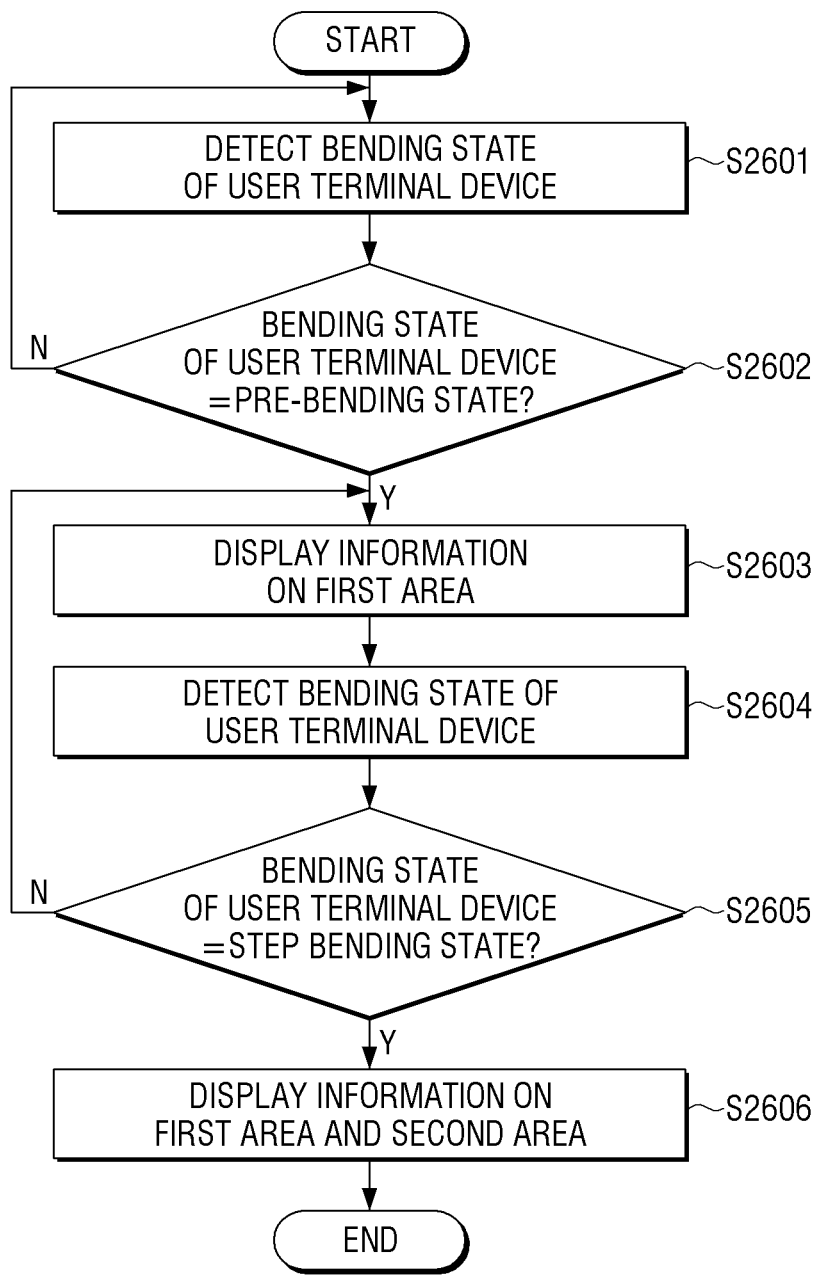
FIG. 26 is a flowchart illustrating a method for a user terminal device to display information, according to yet another exemplary embodiment.

FIG. 26 is a flowchart illustrating a method for the user terminal device 10 to display a content, according to another exemplary embodiment.

In S2601, the user terminal device 10 may detect the bending state of the user terminal device 10.

In 2602, the user terminal device 10 may determine whether the user terminal device 10 is in a pre-bending state or not based on the detected bending state.

If the user terminal device 10 is determined to be in the pre-bending state (S2602-Y), the user terminal device 10 may display information on the first area 20-1 of the flexible display 20 in S2603.

In S2604, the user terminal device 10 may detect the bending state of the user terminal device 10.

In S2605, the user terminal device 10 may determine whether the user terminal device 10 is in a step-bending state based on the bending state detected in S2604. In response to the user terminal device 10 being in the step-bending state (S2605-Y), the user terminal device 10 may display information on the first area 20-1 and the second area 20-2 of the flexible display 20 in S2606. For example, the user terminal device 10 may display a message input screen on the first area 20-1 and display a keypad screen for inputting a message on the second area 20-2.

The above-described exemplary embodiments can be implemented as a program which is executable in a computer, and can be implemented in a general digital computer which operates the program using a computer-readable recording medium. In addition, the structure of data used in the above-described exemplary embodiments may be recorded on the computer-readable recording medium through various means. The computer-readable recording medium includes a storage medium such as a magnetic storage medium (for example, a ROM, a floppy disk, a hard disk, etc.), and an optical reading medium (for example, a CD-ROM, a DVD, etc.).

The foregoing exemplary embodiments and advantages are merely exemplary and are not to be construed as limiting the present disclosure. The present teaching can be readily applied to other types of apparatuses. Also, the description of the exemplary embodiments of the present disclosure is intended to be illustrative, and not to limit the scope of the claims, and many alternatives, modifications, and variations will be apparent to those skilled in the art.

What is claimed is:

1. A user terminal device which is bendable, comprising:
a flexible display;
a bending sensor configured to detect a bending state of the user terminal device; and
a processor configured to:
based on an event related to an application of the user terminal device occurring while the flexible display is in an unbent state, control the flexible display to display a notification related to the event,
based on the flexible display changing from the unbent state to a bent state in which the flexible display is divided into a first area and a second area while the notification is displayed, control the flexible display to display first information related to the event on the first area, and based on the flexible display changing from the bent state to a further bent state by additional force applied to the user terminal device while the first information is displayed on the first area, control the flexible display to display second information related to the event on the second area while the flexible display is in the further bent state.

2. The user terminal device as claimed in claim 1, wherein the processor, based on the event being a message reception event, controls the flexible display to display information on a message received on the first area and to display a keyboard on the second area.

3. A method performed by a user terminal device to display a content using a flexible display, the method comprising:

based on an event related to an application of the user terminal device occurring while the flexible display is in an unbent state, displaying a notification related to the event;

based on the flexible display changing from the unbent state to a bent state in which the flexible display is divided into a first area and a second area while the notification related to the event is displayed, displaying first information related to the event on the first area; and based on the flexible display changing from the bent state to a further bent state by additional force applied to the user terminal device while the first information is displayed on the first area, displaying second information related to the event on the second area while the flexible display is in the further bent state.

4. The method as claimed in claim 3, wherein, based on the event being a message reception event, information on a received message is displayed on the first area, and a keyboard is displayed on the second area.

* * * * *